(12) United States Patent
Roth et al.

(10) Patent No.: US 12,256,018 B1
(45) Date of Patent: *Mar. 18, 2025

(54) DYNAMIC RESPONSE SIGNING CAPABILITY IN A DISTRIBUTED SYSTEM

(71) Applicant: Amazon Technologies, Inc., Seattle, WA (US)

(72) Inventors: Gregory Branchek Roth, Seattle, WA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,756

(22) Filed: Oct. 4, 2023

Related U.S. Application Data

(63) Continuation of application No. 18/086,588, filed on Dec. 21, 2022, now Pat. No. 11,811,950, which is a continuation of application No. 16/440,899, filed on Jun. 13, 2019, now Pat. No. 11,546,169, which is a continuation of application No. 14/318,457, filed on Jun. 27, 2014, now Pat. No. 10,326,597.

(51) Int. Cl.
*H04L 9/32* (2006.01)
*H04L 9/08* (2006.01)

(52) U.S. Cl.
CPC .......... *H04L 9/3247* (2013.01); *H04L 9/0836* (2013.01); *H04L 9/0841* (2013.01)

(58) Field of Classification Search
CPC .... H04L 9/3247; H04L 9/0836; H04L 9/0841
See application file for complete search history.

(56) References Cited

U.S. PATENT DOCUMENTS

| | | | |
|---|---|---|---|
| 5,179,591 | A | 1/1993 | Hardy et al. |
| 5,200,999 | A | 4/1993 | Matyas et al. |
| 5,497,421 | A | 3/1996 | Kaufman et al. |
| 5,956,404 | A | 9/1999 | Schneier et al. |
| 6,084,969 | A | 7/2000 | Wright et al. |

(Continued)

FOREIGN PATENT DOCUMENTS

| | | |
|---|---|---|
| CN | 1254464 A | 5/2000 |
| JP | 2003022253 A | 1/2003 |

(Continued)

OTHER PUBLICATIONS

Amazon, "Amazon Prime Video—security considerations," Amazon.com General Help Forum, http://www.amazon.com/gp/help/customer/forums?e=UTFB&cdForum=Fx2NFGOONPZEXIP&cdPage=1&cdSort=newest&cdThread=Tx18VZVGGU0Y32, latest reply Jun. 17, 2013, 3 pages.

(Continued)

*Primary Examiner* — Amie C. Lin
(74) *Attorney, Agent, or Firm* — Davis Wright Tremaine LLP

(57) ABSTRACT

A system that provides responses to requests obtains a key that is used to digitally sign the request. The key is derived from information that is shared with a requestor to which the response is sent. The requestor derives, using the shared information, a key usable to verify the digital signature of the response, thereby enabling the requestor to operate in accordance with whether the digital signature of the response matches the response.

20 Claims, 10 Drawing Sheets

(56) References Cited

U.S. PATENT DOCUMENTS

| | | | |
|---|---|---|---|
| 6,097,817 A | 8/2000 | Bilgic et al. |
| 6,185,316 B1 | 2/2001 | Buffam |
| 6,233,565 B1 | 5/2001 | Lewis et al. |
| 6,397,261 B1 | 5/2002 | Eldridge et al. |
| 6,453,416 B1 | 9/2002 | Epstein |
| 6,601,172 B1 | 7/2003 | Epstein |
| 6,643,774 B1 | 11/2003 | McGarvey |
| 6,711,679 B1 | 3/2004 | Guski et al. |
| 6,826,686 B1 | 11/2004 | Peyravian et al. |
| 6,851,054 B2 | 2/2005 | Wheeler et al. |
| 6,957,393 B2 | 10/2005 | Fano et al. |
| 6,959,394 B1 | 10/2005 | Brickell et al. |
| 6,985,583 B1 | 1/2006 | Brainard et al. |
| 7,010,689 B1 | 3/2006 | Matyas, Jr. et al. |
| 7,073,195 B2 | 7/2006 | Brickell et al. |
| 7,139,917 B2 | 11/2006 | Jablon |
| 7,228,417 B2 | 6/2007 | Roskind |
| 7,320,076 B2 | 1/2008 | Caronni |
| 7,337,448 B1 | 2/2008 | Dalia et al. |
| 7,512,965 B1 | 3/2009 | Amdur et al. |
| 7,685,430 B1 | 3/2010 | Masurkar |
| 7,721,322 B2 | 5/2010 | Sastry et al. |
| 7,757,271 B2 | 7/2010 | Amdur et al. |
| 7,765,584 B2 | 7/2010 | Roskind |
| 7,836,306 B2 | 11/2010 | Pyle et al. |
| 7,890,767 B2 | 2/2011 | Smith et al. |
| 7,913,084 B2 | 3/2011 | Medvinsky et al. |
| 7,917,764 B2 | 3/2011 | Futa et al. |
| 8,006,289 B2 | 8/2011 | Hinton et al. |
| 8,024,562 B2 | 9/2011 | Gentry et al. |
| 8,041,954 B2 | 10/2011 | Plesman |
| 8,059,820 B2 | 11/2011 | Malaviarachchi et al. |
| 8,151,116 B2 | 4/2012 | van der Horst et al. |
| 8,275,356 B2 | 9/2012 | Hickie |
| 8,332,922 B2 | 12/2012 | Dickinson et al. |
| 8,370,638 B2 | 2/2013 | Duane et al. |
| 8,386,800 B2 | 2/2013 | Kocher et al. |
| 8,387,117 B2 | 2/2013 | Eom et al. |
| 8,418,222 B2 | 4/2013 | Gbadegesin et al. |
| 8,423,759 B2 | 4/2013 | Moreau |
| 8,453,198 B2 | 5/2013 | Band et al. |
| 8,464,058 B1 | 6/2013 | Chen et al. |
| 8,464,354 B2 | 6/2013 | Teow et al. |
| 8,522,025 B2 | 8/2013 | Lakshmeshwar et al. |
| 8,533,772 B2 | 9/2013 | Garg et al. |
| 8,543,916 B2 | 9/2013 | Anderson et al. |
| 8,561,152 B2 | 10/2013 | Novak et al. |
| 8,621,561 B2 | 12/2013 | Cross et al. |
| 8,688,813 B2 | 4/2014 | Maes |
| 8,695,075 B2 | 4/2014 | Anderson et al. |
| 8,700,893 B2 | 4/2014 | Thom et al. |
| 8,739,308 B1 | 5/2014 | Roth et al. |
| 8,745,205 B2 | 6/2014 | Anderson et al. |
| 8,752,203 B2 | 6/2014 | Reinertsen |
| 8,776,190 B1 | 7/2014 | Cavage et al. |
| 8,776,204 B2 | 7/2014 | Faynberg et al. |
| 8,806,187 B1* | 8/2014 | Vemula ............... H04L 67/306 713/150 |
| 8,868,923 B1 | 10/2014 | Hamlet et al. |
| 8,892,865 B1 | 11/2014 | Roth et al. |
| 9,219,753 B2 | 12/2015 | Fleischman et al. |
| 2001/0008013 A1 | 7/2001 | Johnson et al. |
| 2001/0018739 A1 | 8/2001 | Anderson et al. |
| 2002/0016840 A1 | 2/2002 | Herzog et al. |
| 2002/0067832 A1 | 6/2002 | Jablon |
| 2002/0112181 A1 | 8/2002 | Smith |
| 2002/0161723 A1 | 10/2002 | Asokan et al. |
| 2002/0161998 A1 | 10/2002 | Cromer et al. |
| 2002/0162019 A1 | 10/2002 | Berry et al. |
| 2002/0174048 A1 | 11/2002 | Dheer et al. |
| 2002/0194483 A1 | 12/2002 | Wenocur et al. |
| 2002/0198848 A1 | 12/2002 | Michener |
| 2003/0016826 A1 | 1/2003 | Asano et al. |
| 2003/0041110 A1 | 2/2003 | Wenocur et al. |
| 2003/0120940 A1 | 6/2003 | Vataja |
| 2003/0135740 A1 | 7/2003 | Talmor et al. |
| 2003/0142826 A1* | 7/2003 | Asano ............... H04L 9/0836 380/277 |
| 2003/0145197 A1 | 7/2003 | Lee et al. |
| 2003/0145223 A1 | 7/2003 | Brickell et al. |
| 2003/0149781 A1 | 8/2003 | Yared et al. |
| 2003/0188117 A1 | 10/2003 | Yoshino et al. |
| 2003/0196087 A1 | 10/2003 | Stringer et al. |
| 2004/0088260 A1 | 5/2004 | Foster et al. |
| 2004/0103096 A1 | 5/2004 | Larsen |
| 2004/0122958 A1 | 6/2004 | Wardrop |
| 2004/0128505 A1 | 7/2004 | Larsen |
| 2004/0128510 A1 | 7/2004 | Larsen |
| 2004/0131185 A1 | 7/2004 | Kakumer |
| 2004/0143733 A1 | 7/2004 | Ophir et al. |
| 2004/0158734 A1 | 8/2004 | Larsen |
| 2004/0172535 A1 | 9/2004 | Jakobsson et al. |
| 2005/0036611 A1 | 2/2005 | Seaton et al. |
| 2005/0043999 A1 | 2/2005 | Ji et al. |
| 2005/0060580 A1 | 3/2005 | Chebolu et al. |
| 2005/0080914 A1 | 4/2005 | Lerner et al. |
| 2005/0132192 A1 | 6/2005 | Jeffries et al. |
| 2005/0132215 A1 | 6/2005 | Wang et al. |
| 2005/0166263 A1 | 7/2005 | Nanopoulos et al. |
| 2005/0235148 A1 | 10/2005 | Scheidt et al. |
| 2005/0273862 A1 | 12/2005 | Benaloh et al. |
| 2005/0278547 A1 | 12/2005 | Hyndman et al. |
| 2006/0070116 A1 | 3/2006 | Park |
| 2006/0075462 A1 | 4/2006 | Golan et al. |
| 2006/0094406 A1 | 5/2006 | Cortegiano |
| 2006/0094410 A1 | 5/2006 | Cortegiano |
| 2006/0100928 A1 | 5/2006 | Walczak et al. |
| 2006/0130100 A1 | 6/2006 | Pentland |
| 2006/0149677 A1 | 7/2006 | Shahine et al. |
| 2006/0174125 A1 | 8/2006 | Brookner |
| 2006/0190331 A1 | 8/2006 | Tollinger et al. |
| 2006/0206440 A1 | 9/2006 | Anderson et al. |
| 2006/0206925 A1 | 9/2006 | Dillaway et al. |
| 2006/0218625 A1 | 9/2006 | Pearson et al. |
| 2006/0230284 A1 | 10/2006 | Fiske |
| 2006/0256961 A1 | 11/2006 | Brainard et al. |
| 2006/0271785 A1 | 11/2006 | Holtmanns et al. |
| 2006/0282878 A1 | 12/2006 | Stanley et al. |
| 2007/0005955 A1 | 1/2007 | Pyle et al. |
| 2007/0033396 A1 | 2/2007 | Zhang et al. |
| 2007/0037552 A1 | 2/2007 | Lee et al. |
| 2007/0061571 A1 | 3/2007 | Hammes et al. |
| 2007/0061885 A1 | 3/2007 | Hammes et al. |
| 2007/0136361 A1 | 6/2007 | Lee et al. |
| 2007/0157309 A1 | 7/2007 | Bin et al. |
| 2007/0174614 A1 | 7/2007 | Duane et al. |
| 2007/0186102 A1 | 8/2007 | Ng |
| 2007/0223706 A1* | 9/2007 | Gantman ............... G06F 21/602 380/286 |
| 2007/0234410 A1 | 10/2007 | Geller |
| 2007/0250706 A1 | 10/2007 | Oba |
| 2007/0277231 A1 | 11/2007 | Medvinsky et al. |
| 2008/0010665 A1 | 1/2008 | Hinton et al. |
| 2008/0016537 A1 | 1/2008 | Little et al. |
| 2008/0019527 A1 | 1/2008 | Youn et al. |
| 2008/0040773 A1 | 2/2008 | AlBadarin et al. |
| 2008/0066150 A1 | 3/2008 | Lim |
| 2008/0080718 A1 | 4/2008 | Meijer et al. |
| 2008/0083036 A1 | 4/2008 | Ozzie et al. |
| 2008/0163337 A1 | 7/2008 | Tuliani et al. |
| 2008/0168530 A1 | 7/2008 | Kuehr-McLaren et al. |
| 2008/0182592 A1 | 7/2008 | Cha et al. |
| 2008/0222694 A1 | 9/2008 | Nakae |
| 2008/0301052 A1 | 12/2008 | Yonge, III et al. |
| 2008/0301444 A1 | 12/2008 | Kim et al. |
| 2008/0301630 A1 | 12/2008 | Arnold et al. |
| 2008/0313719 A1 | 12/2008 | Kaliski, Jr. et al. |
| 2009/0013402 A1 | 1/2009 | Plesman |
| 2009/0019134 A1 | 1/2009 | Bellifemine et al. |
| 2009/0049518 A1 | 2/2009 | Roman et al. |
| 2009/0172793 A1 | 7/2009 | Newstadt et al. |
| 2009/0199009 A1 | 8/2009 | Chia et al. |
| 2009/0210712 A1 | 8/2009 | Fort |
| 2009/0217385 A1 | 8/2009 | Teow et al. |

(56) References Cited

U.S. PATENT DOCUMENTS

| | | |
|---|---|---|
| 2009/0254572 A1 | 10/2009 | Redlich et al. |
| 2009/0254978 A1 | 10/2009 | Rouskov et al. |
| 2009/0287935 A1 | 11/2009 | Aull et al. |
| 2009/0320093 A1 | 12/2009 | Glazier et al. |
| 2010/0017603 A1 | 1/2010 | Jones |
| 2010/0037304 A1 | 2/2010 | Canning et al. |
| 2010/0058060 A1 | 3/2010 | Schneider |
| 2010/0058072 A1 | 3/2010 | Teow et al. |
| 2010/0071056 A1 | 3/2010 | Cheng et al. |
| 2010/0083001 A1 | 4/2010 | Shah et al. |
| 2010/0111296 A1 | 5/2010 | Brown et al. |
| 2010/0125894 A1 | 5/2010 | Yasrebi et al. |
| 2010/0131756 A1 | 5/2010 | Schneider |
| 2010/0142704 A1 | 6/2010 | Camenisch et al. |
| 2010/0205649 A1 | 8/2010 | Becker et al. |
| 2010/0239095 A1 | 9/2010 | Carter et al. |
| 2010/0251347 A1 | 9/2010 | Roskind |
| 2010/0269156 A1 | 10/2010 | Hohlfeld et al. |
| 2010/0290476 A1 | 11/2010 | Brindle et al. |
| 2010/0332845 A1 | 12/2010 | Asaka |
| 2011/0004753 A1 | 1/2011 | Gomi et al. |
| 2011/0010538 A1 | 1/2011 | Falk et al. |
| 2011/0035593 A1 | 2/2011 | Pyle et al. |
| 2011/0055562 A1 | 3/2011 | Adelman et al. |
| 2011/0055585 A1 | 3/2011 | Lee |
| 2011/0078107 A1 | 3/2011 | Almeida et al. |
| 2011/0083015 A1 | 4/2011 | Meier |
| 2011/0099362 A1 | 4/2011 | Haga et al. |
| 2011/0131415 A1 | 6/2011 | Schneider |
| 2011/0138192 A1 | 6/2011 | Kocher et al. |
| 2011/0167479 A1 | 7/2011 | Maes |
| 2011/0179469 A1 | 7/2011 | Blinn et al. |
| 2011/0213957 A1 | 9/2011 | Tsai et al. |
| 2011/0231940 A1 | 9/2011 | Perumal et al. |
| 2011/0239283 A1 | 9/2011 | Chern |
| 2011/0252229 A1 | 10/2011 | Belenkiy et al. |
| 2011/0265172 A1 | 10/2011 | Sharma et al. |
| 2011/0293098 A1 | 12/2011 | Fu et al. |
| 2011/0296172 A1 | 12/2011 | Fu et al. |
| 2011/0296497 A1 | 12/2011 | Becker |
| 2011/0311055 A1 | 12/2011 | Parann-Nissany |
| 2011/0320606 A1 | 12/2011 | Madduri et al. |
| 2012/0017095 A1 | 1/2012 | Blenkhorn et al. |
| 2012/0020474 A1 | 1/2012 | Kudoh et al. |
| 2012/0023334 A1 | 1/2012 | Brickell et al. |
| 2012/0036551 A1 | 2/2012 | Le Saint et al. |
| 2012/0054625 A1 | 3/2012 | Pugh et al. |
| 2012/0060035 A1 | 3/2012 | Kalmady et al. |
| 2012/0106735 A1 | 5/2012 | Fukuda |
| 2012/0110636 A1 | 5/2012 | Van Biljon et al. |
| 2012/0144034 A1 | 6/2012 | McCarty |
| 2012/0159577 A1 | 6/2012 | Belinkiy et al. |
| 2012/0233216 A1 | 9/2012 | Lim |
| 2012/0243687 A1 | 9/2012 | Li et al. |
| 2012/0245978 A1 | 9/2012 | Jain et al. |
| 2012/0265690 A1 | 10/2012 | Bishop et al. |
| 2012/0317414 A1 | 12/2012 | Glover |
| 2013/0031255 A1 | 1/2013 | Maloy et al. |
| 2013/0086662 A1 | 4/2013 | Roth et al. |
| 2013/0086663 A1* | 4/2013 | Roth .................. H04L 9/3247 726/7 |
| 2013/0111217 A1 | 5/2013 | Kopasz et al. |
| 2013/0124870 A1 | 5/2013 | Rosati et al. |
| 2013/0132232 A1 | 5/2013 | Pestoni et al. |
| 2013/0145447 A1 | 6/2013 | Maron |
| 2013/0166918 A1 | 6/2013 | Shahbazi et al. |
| 2013/0191884 A1 | 7/2013 | Leicher et al. |
| 2013/0198519 A1 | 8/2013 | Marien |
| 2013/0254536 A1 | 9/2013 | Glover |
| 2013/0282461 A1 | 10/2013 | Ovick et al. |
| 2013/0318630 A1 | 11/2013 | Lam |
| 2014/0013409 A1 | 1/2014 | Halageri |
| 2014/0075493 A1 | 3/2014 | Krishnan et al. |
| 2014/0082715 A1 | 3/2014 | Grajek et al. |
| 2014/0122866 A1 | 5/2014 | Haeger et al. |
| 2014/0181925 A1 | 6/2014 | Smith et al. |
| 2014/0208408 A1 | 7/2014 | Bilgen et al. |
| 2014/0281241 A1 | 9/2014 | Husain |
| 2014/0281477 A1 | 9/2014 | Nayshtut et al. |
| 2014/0281487 A1 | 9/2014 | Klausen et al. |
| 2015/0082025 A1 | 3/2015 | Deshpande |
| 2015/0082039 A1 | 3/2015 | Stalzer et al. |
| 2015/0089614 A1 | 3/2015 | Mathew et al. |
| 2015/0326692 A1 | 11/2015 | Kaneko et al. |
| 2015/0381618 A1 | 12/2015 | Lin |
| 2016/0021076 A1 | 1/2016 | In |

FOREIGN PATENT DOCUMENTS

| | | |
|---|---|---|
| JP | 2003058657 A | 2/2003 |
| JP | 2006508471 A | 3/2006 |
| JP | 2006217320 A | 8/2006 |
| JP | 2007505542 A | 3/2007 |
| JP | 2007149010 A | 6/2007 |
| JP | 2007206961 A | 8/2007 |
| JP | 2007233705 A | 9/2007 |
| JP | 2008172728 A | 7/2008 |
| JP | 2008228051 A | 9/2008 |
| JP | 2011066703 A | 3/2011 |
| RU | 2308755 C2 | 10/2007 |
| WO | 2006077822 A1 | 7/2006 |
| WO | 2008024705 A2 | 2/2008 |
| WO | 2014063361 A1 | 5/2014 |

OTHER PUBLICATIONS

Australian Examination Report No. 2, dated Mar. 26, 2018, for Application No. 2012315674, 3 pages.

Australian First Examination Report No. 1, dated May 28, 2019, for Patent Application No. 2018202251, 3 pages.

Australian Notice of Acceptance dated Apr. 5, 2018, for Patent Application No. 2012315674, filed Sep. 28, 2012, 3 pages.

Berners-Lee et al., "Uniform Resource Identifier (URI): Generic Syntax," Network Working Group Request for comments: 3986, The Internet Society 2005 retrieved on Nov. 30, 2011, from http://www.ietf.org/rfc/rfc3986.lxt.

Borisov, "Active Certificates: A Framework for Delegation," Jan. 1, 2002, retrieved Mar. 15, 2019, from hllps://nikita.ca/papers/ms-thesis.pdf, 39 pages.

Broadfoot et al., "Architectures for Secure Delegation Within Grids," Jan. 1, 2003, retrieved Mar. 15, 2019, ram https://www.cs.ox.ac.uk/files/926/RR-03-19.ps, pp. 1-14.

Canadian Office Action for Patent Application No. 2,847,713 dated Jul. 26, 2019, 3 pages.

European Communication Rule 69, dated Jun. 11, 2019, for Patent Application No. 18200502.5, 2 pages.

European Communication under Rule 71 (3) EPC for Application No. 12835045.1, Intention to Grant, dated Apr. 25, 2018, 80 pages.

European Supplemental Search Report for Patent Application No. EP18200502, dated Mar. 25, 2019, 11 pages.

Garay et al., "Timed Release of Standard Digital Signatures," Financial Cryptography, Mar. 11, 2002 [lecture notes n computer science], Springer Berlin Heidelberg, pp. 168-182.

Ghorbei-Talbi et al., "Managing Delegation in Access Control Models," International Conference on Advanced Computing and Communications, pp. 744-751, Dec. 18-21, 2007.

Google, "Encrypting Disks with Customer-Supplied Encryption Keys," last updated Jun. 21, 2017, retrieved from Internet on Jun. 30, 2017, from https://cloud.google.com/compute/docs/disks/customer-supplied-encryption, 15 pages.

International Search Report and Written Opinion mailed Dec. 30, 2014 in International Patent Application No. PCT/US2014/057043, filed Sep. 23, 2014.

International Search Report and Written Opinion mailed Dec. 30, 2014 in International Patent Application No. PCT/US2014/057051, filed Sep. 23, 2014.

International Search Report and Written Opinion mailed Oct. 22, 2014, International Patent Application No. PCT/US2014/042569, filed Jun. 16, 2014.

(56) References Cited

OTHER PUBLICATIONS

Japanese Notice of Allowance, dated Mar. 12, 2019, for Patent Application No. 2017-007876, 15 pages.
Japanese Notice of Rejection, mailed Oct. 2, 2018, for Patent Application No. 2017-007876, 7 pages.
Japanese Official Notice of Final Rejection, mailed Dec. 5, 2017, for Patent Application No. 2017-007876, 10 pages.
Kiyomoto et al., "Design of Self-Delegation for Mobile Terminals," Information and Media Technologies 1 (1):594-605, 2006, reprinted from IPSJ Digital Courier 1:282-293 (2005).
Krawczyk et al., "HMAC: Keyed-Hashing for Message Authentication," Internet Engineering Task Force (IETF) Request for Comments: 2104, Feb. 1997, retrieved Jan. 22, 2015, from https://tols.ielf.org/html/rfc2104, pp. 1-11.
Liscano et al., "A Context-based Delegation Access Control Model for Pervasive Computing," 21st International Conference on Advanced Information Networking and Applications Workshops 2:44-51, May 21-23, 2007.
Massachusetts Institute of Technology, "Kerberos V5 Installation Guide [online]," May 2012 [retrieved on Jun. 27, 2012], retrieved from the Internet: http://web.mit.edu/kerberos/krb5-1.10/krb5-1.10.2/doc/krb5-install.htm, 65 pages.
Massachusetts Institute of Technology, "Kerberos V5 System Administrators Guide [online]," May 2012 retrieved on Jun. 27, 2012], Retrieved from the Internet: http://web.mit.edu/kerberos/krb5-1.10/krb5-1.10.2/doc/krb5-admin.html, 57 pages.
Massachusetts Institute of Technology, "Kerberos V5 UNIX Users Guide," dated May 2012, retrieved on Jun. 28, 2012, from <http://web.mit.edu/kerberos/krb5-1.10/krb5-1.10.2/doc/krb5-user.html>, 38 pages.
Patent Cooperation Treaty, "Notification of Transmittal of the International Search Report and the Written Opinion of the International Searching Authority, or the Declaration," issued to International Application No. PCT/US/058083 on Dec. 27, 2012.
Pearlman et al., "A Community Authorization Service for Group Collaboration," Proceedings of International Workshop on Policies for Distributed Systems, Jun. 5, 2002, pp. 50-59.
Roth et al., "Hierarchical Data Access Techniques," U.S. Appl. No. 13/431,882, filed Mar. 27, 2012.
Russian Decision on Grant dated Aug. 15, 2018, for Patent Application No. 2017135822, 23 pages.
Russian Decision to Grant, dated Aug. 29, 2018, for Patent Application No. 2017135821, 24 pages.
Russian Office Action, dated Jun. 10, 2019, for Patent Application No. 2018137062, 8 pages.
Russian Search Report accompanying Office Action, dated Jun. 10, 2019, for Patent Application No. 2018137062, 4 pages.
Simpson, "PPP Challenge Handshake Authentication Protocol (CHAP)," Network Working Group, Aug. 1996, retrieved from internet Jun. 27, 2012, hllps://tools.ietf.org/html/rfc1994, 13 pages.
Singapore Examination Report dated Feb. 13, 2019, for Patent Application No. 10201608067Q, 4 pages.
Singapore Search Report and Written Opinion, dated Apr. 30, 2018, for Patent Application No. 10201608067Q filed Sep. 28, 2012, 14 pages.
TCG Published, "TPM Main Part 1 Design Principles," Specification Version 1.2, Revision 116, Mar. 1, 2011, 184 Pages.
TCG Published, "TPM Main Part 2 TPM Structures," Specification Version 1.2, Level 2 Revision 116, Mar. 1, 2011, 202 pages.
TCG Published, "TPM Main Part 3 Commands," Specification Version 1.2, Level 2 Revision 116, Mar. 1, 2011, 339 Pages.
U.S. Appl. No. 13/431,760, filed Mar. 27, 2012.
U.S. Appl. No. 13/431,898, filed Mar. 27, 2012.
U.S. Appl. No. 13/944,579, filed Jul. 17, 2013, tilled "Complete Forward Access Sessions".
U.S. Appl. No. 14/225,264, filed Mar. 25, 2014, tilled "Authenticated Storage Operations".
Wang et al., "Extending the Security Assertion Markup Language to Support Delegation for Web Services and Grid Services," IEEE International Conference on Web Services 1:67-74, Jul. 11-15, 2005.
Wikiipedia, "Physical unclonable function," retrieved Aug. 22, 2013, from http://en.wikipedia.org/wiki/Physical_unclonable_function, 8 pages.
Google, "V4 Signing Process with Your Own Program," retrieved Jun. 12, 2024 from <https://cloud.google.com/storage/docs/access-control/signing-urls-manually,> 6 pages.

* cited by examiner

DYNAMIC RESPONSE SIGNING CAPABILITY IN A DISTRIBUTED SYSTEM

CROSS REFERENCE TO RELATED APPLICATION

This application is a continuation of U.S. patent application Ser. No. 18/086,588, filed Dec. 21, 2022, entitled "DYNAMIC RESPONSE SIGNING CAPABILITY IN A DISTRIBUTED SYSTEM," which is a continuation of U.S. patent application Ser. No. 16/440,899, filed Jun. 13, 2019, now U.S. Pat. No. 11,546,169, entitled "DYNAMIC RESPONSE SIGNING CAPABILITY IN A DISTRIBUTED SYSTEM," which is a continuation of U.S. patent application Ser. No. 14/318,457, filed Jun. 27, 2014, now U.S. Pat. No. 10,326,597, entitled "DYNAMIC RESPONSE SIGNING CAPABILITY IN A DISTRIBUTED SYSTEM," the disclosures of which are hereby incorporated herein in their entirety.

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Many systems utilize various methods of authentication to ensure that requests made to the system should be fulfilled. Such techniques enable systems to verify that a requestor corresponds to an identity authorized to cause a request to be fulfilled. Conventional techniques, however, often focus on authentication of requests to a system without much regard to responses provided by the system. Some secure communication protocols, such as transport layer security (TSL) and secure sockets layer (SSL) allow for bidirectional authentication of communications, providing some assurances with respect to the validity of responses received from a system. However, the assurances provided by use of such protocols, to some, may be inadequate. Further, conventional techniques often do not provide the ability to prove that certain responses were received.

BRIEF DESCRIPTION OF THE DRAWINGS

Various embodiments in accordance with the present disclosure will be described with reference to the drawings, in which.

DETAILED DESCRIPTION

Figure 1:
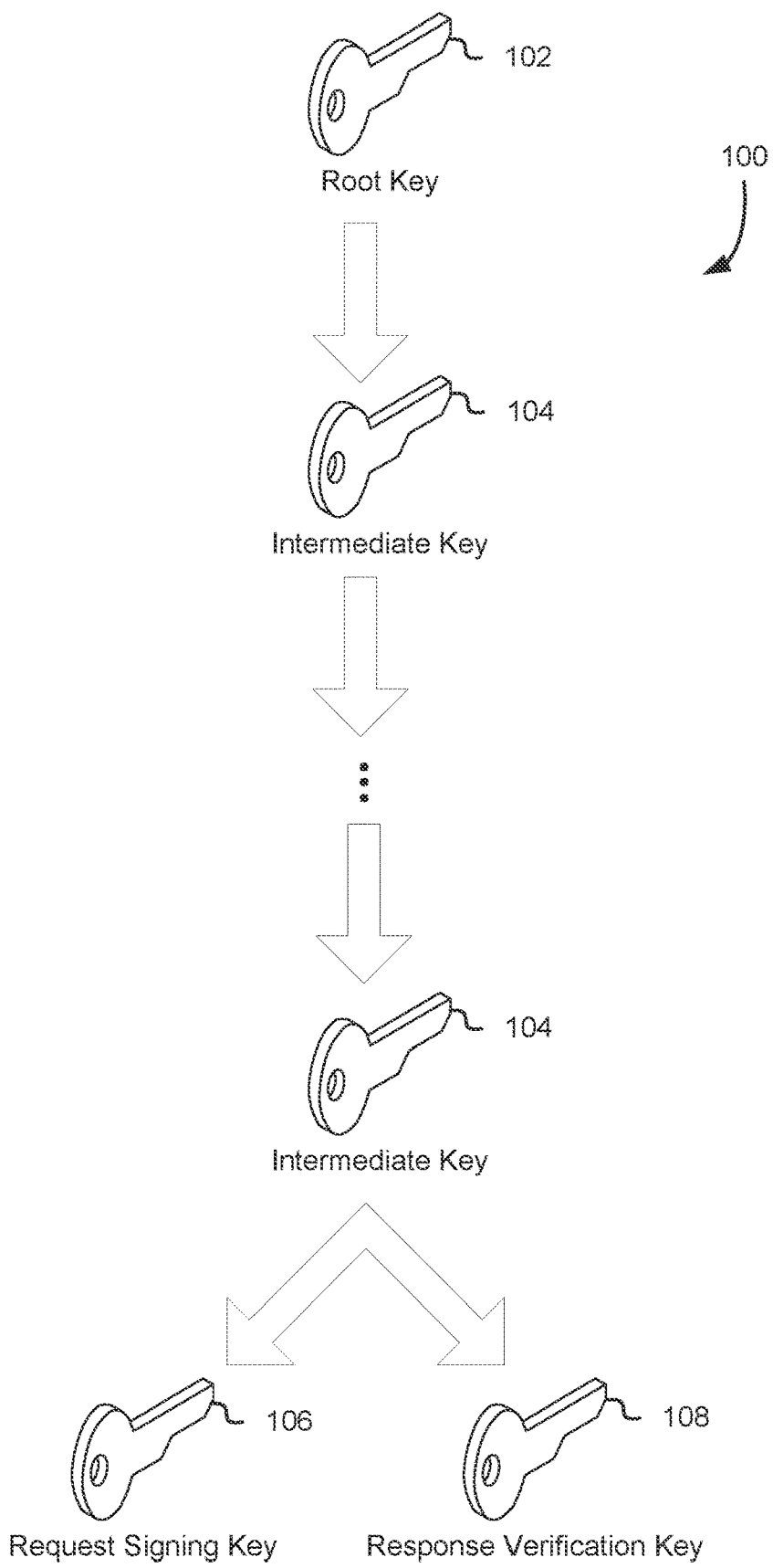
FIG. 1 shows a diagram illustrating an embodiment of deriving cryptographic keys.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the authentication of responses to requests submitted to a system. In an embodiment, a customer system and a service provider system each have access to a cryptographic key. When the customer (i.e., a computing device associated with the customer) submits a request (e.g., an application programming interface (API) request), the service provider may generate a response, digitally sign the generated response, and provide the response with a digital signature of the response to the customer. When the customer receives the response, the customer may access the cryptographic key and use the cryptographic key to verify whether the response matches the digital signature. The manner in which the customer processes the response may depend on whether the response matches the digital signature. In this manner, the customer can verify that the response was generated by the service provider since, without access to the cryptographic key, generation of a digital signature that matches the response would be highly unlikely. It should be noted that, while customers and service providers are used for the purpose of illustration, the techniques described herein are applicable in a wide variety of contexts, including contexts where there is no customer/provider relationship such as, for example, contexts where a single entity controls both the computer system that submits a request and the computer system that provides a digitally signed response. Other contexts in which the techniques described herein are adaptable include contexts where a frontend server is a server of a customer of a service provider and the authentication server provides various information (as discussed herein) as a service of the service provider.

Returning to the illustrative example, a customer and a service provider may have access to a cryptographic key (signing key) in various ways in accordance with various embodiments. In some examples the customer and/or service provider stores the signing key in memory accessible respectively to the customer and/or service provider. In other examples, both the customer and the service provider have access to cryptographic material from which the cryptographic key is derivable. For instance, the customer and the service provider may each store a copy of a cryptographic key from which the signing key is derivable. Alternatively, the customer may store a first cryptographic key from which the signing key is derivable and the service provider may store a second cryptographic key, different from the first cryptographic key, from which the signing key is derivable. In this last example, one of the first cryptographic key or the second cryptographic key may be derivable from the other. Other variations are also considered as being within the scope of the present disclosure and, generally, a signing key or other cryptographic key may be accessible to an entity if that entity has a copy of the signing key or other cryptographic key and/or the ability to generate and/or otherwise determine the signing key or other cryptographic key.

In some embodiments, the service provider system is a distributed system where the server that generates the response to a request does not, for at least some requests, store or otherwise have accessible a key from which a signing key used to digitally sign the response is derivable. In such embodiments, a second server may be configured with authority to access such keys. An example of such a second server is an authentication server, discussed in more detail below. In some examples, when a first server receives a request from a client computer system (client), the first server obtains a signing key from the second server. To provide the signing key, the second server may access cryptographic material mutually accessible to the second server and the client and use the accessed cryptographic material to derive the signing key which is then provided to the first server to enable the first server to digitally sign a response to the client. The first server may cache the signing key for use in digitally signing future requests received from the client.

Additional operations may be performed in such a distributed system. For example, in some embodiments, the request from the client is digitally signed by the client. When the first server receives the request with a digital signature of the request, the client may transmit the request and the digital signature to the second server. The second server may, using cryptographic material mutually accessible to the second server and the client, verify the digital signature and, contingent on the digital signature matching the request, use the same or different cryptographic material mutually accessible to the second server and the client to determine (e.g., derive) the signing key. As applicable, the second server may indicate that the digital signature did not match the response or provide the signing key.

The second server may also determine other pieces of information based at least in part on the same or different cryptographic material mutually accessible to the second server and the client and provide the other pieces of information to the first server for use thereby. For example, the second server may determine (e.g., derive) a request key different from the signing key used to digitally sign responses so that the first server can cache the signing key. If the client submits a future request with a digital signature and the request key is still in the cache, the first server can use the request key to verify the digital signature without the need to communicate with the first server, thereby resulting in lower latency when processing requests. As another example, the second server may derive a forward access session which may comprise cryptographic material that the first server can use to submit requests to other systems (e.g., other services provided by the service provider) on behalf of the customer associated with the client. The forward access session may be used for various purposes, such as to enable the first server to cryptographically prove to another system the existence of a pending request by the client whose fulfillment involves one or more operations by the other system and/or simply to allow the first server to cryptographically prove authority to submit requests on behalf of the customer. Examples of forward access sessions are discussed in U.S. application Ser. No. 13/944,579, filed on Jul. 17, 2013, titled "Complete Forward Access Sessions," which is incorporated herein by reference and in which example forward access sessions are referred to as "information instances." In some embodiments, a forward access session comprises a cryptographic key derived from the same root key used to derive a request verification key, where the two keys are different. The cryptographic key in the forward access session may be used by the frontend server to digitally sign requests to another system such that digital of the signatures are verifiable as valid by the other system, thereby enabling the other system to fulfill the requests when any other requirements for request fulfillment (e.g., compliance with policy) are met.

In some embodiments, the second server additionally stores access control policies that define the conditions for fulfillment of requests. When a request is forwarded by the first server, the second server may access policies applicable to the request. A policy may be applicable to the request when, for instance, the policy is associated with an identity of the requestor and/or the policy is associated with a resource (e.g., stored data, a logical container for data, a virtual computer system or other device, a collection of resources, an identity, etc.) affected by fulfillment of the request. The second server may determine whether fulfillment of the request is consistent with the applicable policies and provide a response to the first server accordingly, such as by indicating that the request should be allowed or denied. The second server may also provide some or all of the policies to the first server to enable the first server to cache the policies and evaluate the policies against at least some future requests without the need to communicate with the second server, further enhancing the ability to reduce latency for at least some requests.

One or more cryptographic operations may be performed to derive a signing or other cryptographic key such that the results of the derivation have desired mathematical properties, such as properties that render the cryptographic material used to derive a cryptographic key computationally impractical to determine from the derived key. Further, the manner in which cryptographic keys are derived may facilitate secure and efficient cryptographic key management across a distributed system. In some examples, a service provider utilizes a distributed system where the computing nodes in the distributed system that utilize cryptographic keys are organized in logical divisions. For instance, the nodes may be assigned regions that correspond to geographic regions. Nodes in each region may be distributed among different logical groupings referred to as zones or data zones. Nodes in a zone may be used for different services of multiple services provided by a service provider. Other example logical categorizations of nodes may also be used. To contain the effects of a security breach, however unlikely, for an individual customer, different cryptographic keys may be provided to different categorizations of nodes so that, nodes of a first service in a first zone of a first region may utilize a different cryptographic key than nodes in a second service of a second zone of a second region. In this manner, should unauthorized access to a cryptographic key of a node of the first service in the first zone of the first region be attained, the unauthorized access does not enable access to cryptographic keys outside of the first service of the first zone of the first region. In this manner, the security breach can be addressed (e.g., by rotating the compromised cryptographic key) for a contained set of nodes without having to address the breach outside of the contained set of nodes.

To prevent customers of a service provider from the complexities of managing multiple different cryptographic keys and determining the appropriate circumstances of when to use each particular cryptographic key, in various embodiments, an individual cryptographic key may be used to derive multiple cryptographic keys, each for a different set of nodes in the service provider's distributed system. In some embodiments, the way in which the sets of nodes are organized indicates how the derivation should take place. For instance, when sets of nodes are grouped hierarchically, such as described above, identifiers of places in different levels of the hierarchy may define a key path, which, in an embodiment, is an ordered set of parameters used to derive a cryptographic key. Using the above illustrative example, a key path for a first node of a first service (Serivce_1) in a first zone (Zone_1) of a first region (Region_1) may have a key path denoted: Region_1/Zone_1/Service_1. Key paths may also introduce temporal limitations by including an encoding of a time period (e.g., current date or timestamp) into the key path such that, a system verifying a digital signature can check whether the digital signature was generated while a cryptographic key was valid (e.g., unexpired) and whether the digital signature was received within sufficient (e.g., predetermined) proximity to a current time. Cryptographic material may be used to cryptographically derive a cryptographic key in accordance with the key path such that, from the same cryptographic material, different key paths result in different cryptographic keys with very high probability. The use of a one-way function, such as a message authentication code algorithm or key derivation function, helps ensure that access to a cryptographic key is insufficient for determining the cryptographic material used to derive the cryptographic key.

The parameters used to derive a cryptographic key may be maintained not as a secret. For example, a service provider may publish the parameters it uses and/or messages between computing devices may indicate the parameters that were used to derive a cryptographic key. In this manner, two entities (e.g., the customer and the service provider) each with access to the same cryptographic material are able to derive the same cryptographic keys, but entities without access to the cryptographic material are unable to, absent extraordinary computational effort or luck, determine the derived cryptographic key(s). In this manner, a customer may maintain cryptographic material and use the cryptographic material to derive different cryptographic keys as necessary without having to manage different cryptographic keys for different contexts in which requests are submitted and/or responses are received.

FIG. 1 shows a diagram 100 illustrating various aspects of the present disclosure. As discussed above, various techniques described herein relate to digital signatures of responses to requests. In some examples, a cryptographic key is used to derive both a request key and a request signing key and a response verification key, which may be unique to an entity (e.g., customer) in a set of keys of a service provider. The diagram shown in FIG. 1, accordingly, illustrates a manner by which such cryptographic keys may be derived. In an embodiment, a key derivation process begins with a root key 102. In an embodiment, a root key is a cryptographic key accessible both to an entity performing a key derivation illustrated in FIG. 1 and another entity which also may perform the same derivation or, generally, may perform a derivation to arrive at the same result. In some examples, the root key 102 is a cryptographic key shared between both entities. In other examples, the root key 102 is a cryptographic key derived from another cryptographic key that is shared between both entities.

As an illustrative example, the entities may be, respectively, a computing resource service provider and a customer of the computing resource service provider. The customer and a key management system of the computing resource service provider may each store a copy of a cryptographic key. From the perspective of the customer, the cryptographic key stored by the customer may be the root key 102. From the perspective of the key management system, the root key 102 may be used by the key management system to drive various keys, however in some embodiments the key management system uses a cryptographic key to derive another cryptographic key which is then provided to another system which then derives the request finding key and the response verification key. But from the perspective of the other system that receives the derived key, the received derived key would be a root key 102. Thus, it can be said that a root key 102 is a cryptographic key that is stored by or otherwise accessible to another system, where accessibility to may correspond to the ability to derive or otherwise obtain the root key 102.

As illustrated in FIG. 1, the root key 102 may be used to derive an intermediate key 104. Techniques for deriving the intermediate key 104 are discussed in more detail below. Briefly, in some embodiments deriving the intermediate key 104 from the root key 102 includes performing a cryptographic operation based at least in part on the root key 102 and one or more key derivation parameters. The cryptographic operation may be, for example, computation of a message authentication code (MAC) or, generally, output of a function that has particular mathematical properties, such as the inability to determine inputs based on the output. Other examples and additional details are discussed below. As illustrated in FIG. 1, the intermediate key 104 may be used to derive another intermediate key 104. Intermediates keys 104 may be used to derive additional intermediate keys until an intermediate key 104 is used to derive a request signing key 106 and a response verification key 108. In some embodiments, the request signing key 106 and the response verification key 108 are derived from an intermediate key 104 using different sets of key derivation parameters where the different sets of key derivation parameters may have a non-empty intersection.

It should be noted that numerous variations of key derivation are considered as being within the scope of the present disclosure. For example, FIG. 1 illustrates an embodiment whereby the request signing key 106 and the response verification key 108 are both directly derived from the same intermediate key 104. The request signing key 106 and the response verification key 108 may be directly derived from different intermediate keys 104. As another example of a variation considered as being within the scope of the present disclosure, the request signing key 106 may be derived from the response verification key 108 or the response verification key 108 may be derived from the request signing key 106. In some examples, the request signing key 106 and response verification key 108 are derived from different root keys. If the keys derived from a common root key are considered to form a tree structure, it may be said that the request signing key 106 and the response verification key 108 in some embodiments may lack a common ancestor in the tree structure, where a common ancestor is a cryptographic key usable to derive both (with different parameters, when the cryptographic keys are different). Further, additional cryptographic keys may be derived from a root key 102 where the different derived keys may or may not share the same level in the tree.

Figure 2:
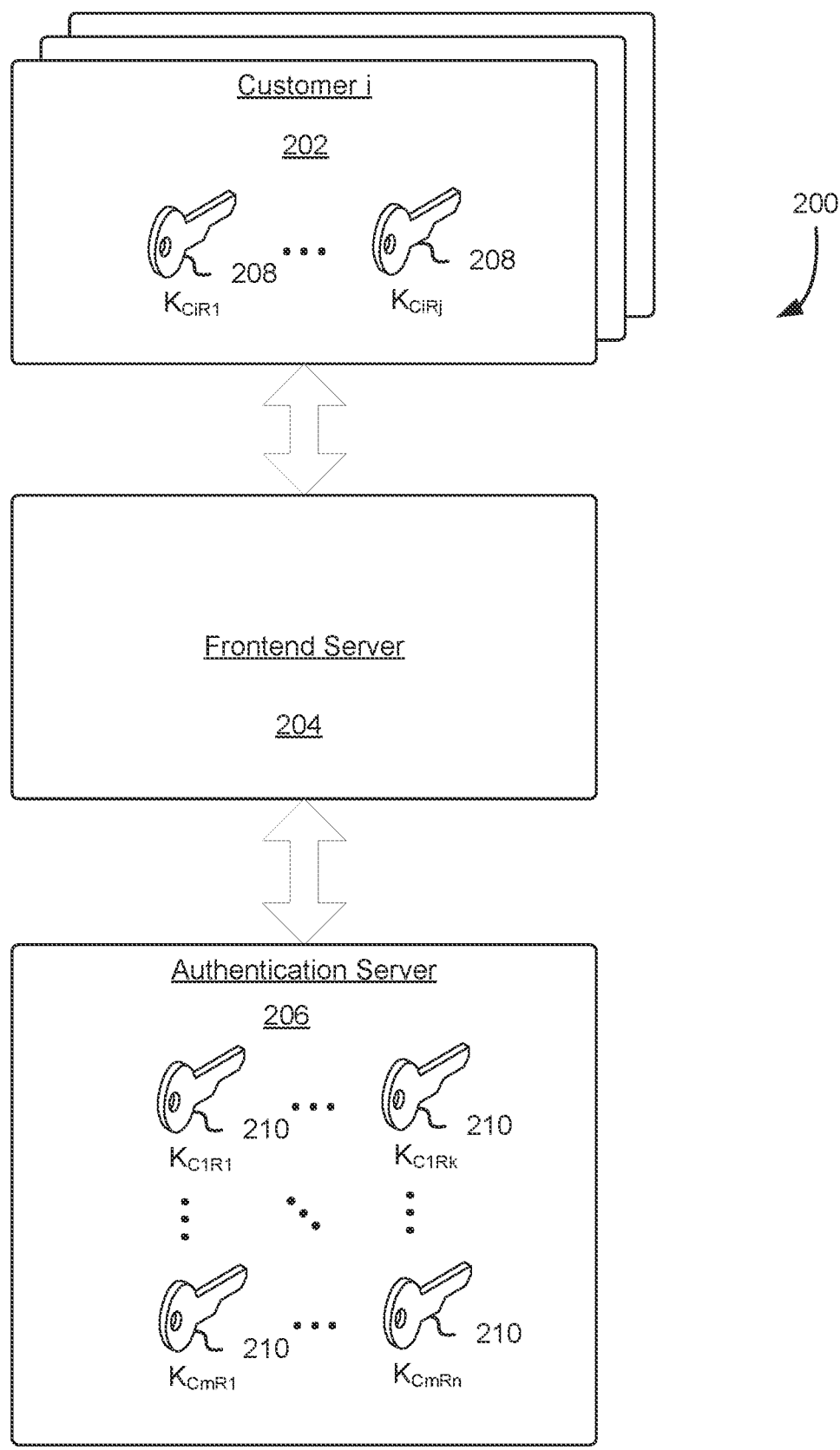
FIG. 2 shows an illustrative example of an environment and how cryptographic material is shared throughout the environment in accordance with at least one embodiment.

FIG. 2 shows an illustrative example of an environment 200 in which various embodiments may be implemented. As illustrated in FIG. 2, the environment 200 includes client devices and multiple types of server devices. The client devices may be physical or virtual computer systems, such as described below. Generally, a client device may be any system configured to perform operations described herein. In this particular example, the environment 200 includes multiple customer computing devices 202. Similarly, the environment 200 may include a frontend server 204 and an authentication server 206. The client devices 202 may each have an associated customer of a service provider that operates one or both of the frontend server 204 and authentication server 206. While not shown in FIG. 2, an environment such as the environment 200 may include additional devices such as multiple frontend servers 204 and multiple authentication servers 206. Other devices, such as networking equipment and other systems may also be included in the environment 200.

In some embodiments, multiple frontend servers and/or multiple authentication servers are behind load balancing computer systems to enable the distribution of load across multiple devices from the customer computing devices 202. Generally, a computer system may comprise the frontend server 204 and authentication server 206 and possibly additional computer systems and, as such, may be a distributed computer system (also referred to as a distributed system). In some embodiments, the computer system (e.g., a distributed computer system) is used to provide one or more services and, in such instances, may be referred to as a service provider computer system. For example, embodiments of the present disclosure are applicable to the providing of computing resources and the environment 200 may include additional systems that host the computing resources provided. Example computer systems include host computer systems that provide virtual computer systems as a service, data storage servers for storing data as a service, database systems that are used to provide database services and others.

As illustrated in FIG. 2, individual customer computing devices 202 may include one or more root keys 208 which may be symmetric cryptographic keys (e.g., keys used in symmetric cryptographic algorithms). The root key may be cryptographic material (e.g., information) used directly or indirectly in one or more cryptographic operations. While the root keys 208 and other elements are referred to as "keys," it should be noted that the scope of the present disclosure extends to embodiments where items referred to as "keys" are not necessarily used as such, but rather are used to derive items used as cryptographic keys.

One or more root keys accessible to a customer computer device 202 may also be accessible to the authentication server 206. As noted in FIG. 2, the authentication server 206 may have multiple root keys 210 for multiple customers of a computing resource service provider for which the frontend server 204 and/or authentication server 206 operate. For a particular customer computing device 202, the authentication server 206 may share all the root keys accessible to the customer computing device 202 or a proper subset thereof. It should be noted that by cryptographic keys being accessible (or available) to both a customer computing device 202 and the authentication server 206, the customer computing device 202 and the authentication server 206 do not necessarily need to store copies of the same cryptographic key. As noted, for example, accessibility to a cryptographic key may be the ability to access another cryptographic key from which another cryptographic key can be derived. As illustrated in FIG. 2, the frontend server 204 does not have access to the root keys 208, 210. In some embodiments, the frontend server 204 never has access to the root keys 208, 210, but only cryptographic keys derived from the root keys 208, 210. In this manner, a security compromise of the frontend server 204 does not compromise the root keys 208, 210.

Figure 3:
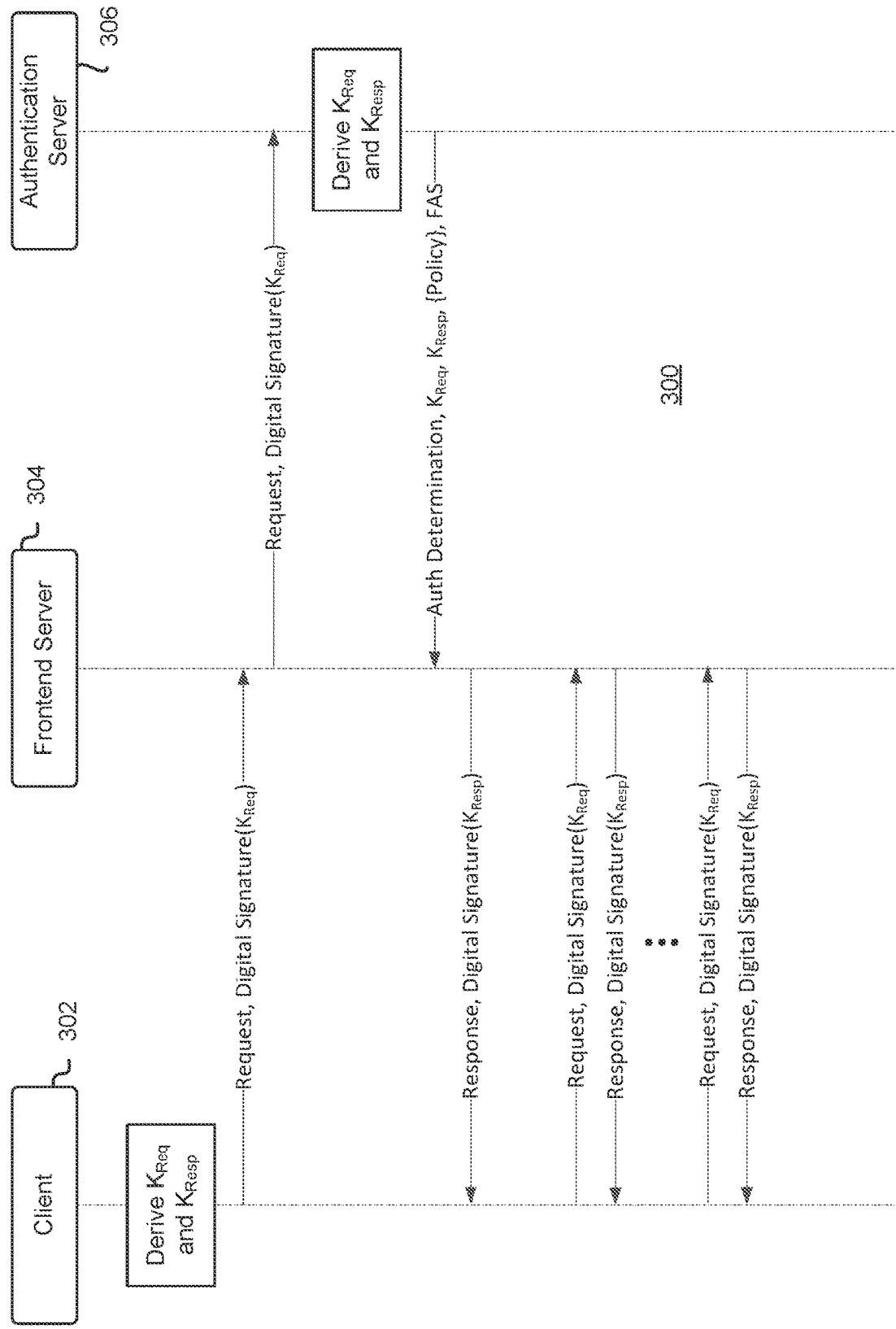
FIG. 3 shows an illustrative example of an information flow diagram illustrating various aspects of the present disclosure in accordance with at least one embodiment.

FIG. 3 shows an illustrative example of a flow diagram 300 illustrating various communications which may be transmitted in accordance with various embodiments. The flow of information illustrated in FIG. 3 involves a client 302 of a frontend server 304 which interacts with an authentication server 306. The client 302 may be a client device such as described above, or otherwise a client of the frontend server 304. The frontend server may be a server computer system, such as described above. In an embodiment, as illustrated in FIG. 3, the client 302 derives a request signing key and a response verification key. In some embodiments the request signing key and the response verification key are different cryptographic keys although, in some embodiments, the technique described herein may be adapted such that the request signing key and response verification key are the same (i.e., a single cryptographic key is derived in place of the request signing key and the response verification key).

It should be noted that while FIG. 3 shows the client 302 deriving the request signing key and response verification key at the same time, the request signing key and response verification keys may be derived at different times and, generally, each of the request signing key and response verification key may be derived at any time before needed to perform a cryptographic operation such as digital signature generation or digital signature verification. Further, while FIG. 3, similarly, shows entities that derive cryptographic keys may derive the cryptographic keys synchronously with performance of processes described herein or asynchronously with respect to cryptographic keys derived asynchronously. For example, a computer system may derive one or more cryptographic keys and store the derived cryptographic keys in memory for later access during another process in which the cryptographic keys are used. Returning to the illustrated example in FIG. 3, once at least the request signing key has been derived, the client 302 may generate a request, which may be in a web service application programming interface request. While web service application programming interface requests are used extensively for the purpose of illustration, the techniques of the present disclosure may be used with other types of requests, such as storage operation commands such as described in U.S. application Ser. No. 14/225,264, titled "Authenticated Storage Operations, filed on Mar. 25, 2014, which is incorporated by reference and whose disclosed techniques may be combined with techniques described herein. Further, responses that are digitally signed, as discussed above and in more detail below, may be responses to storage operation commands.

Returning to the illustrated embodiment, the generated request may be digitally signed by the client 302 using the request signing key thereby resulting in a digital signature of the request. The request and its corresponding digital signature may be transmitted from the client 302 to the frontend server 304 such that the frontend server 304 may fulfill the request contingent on any requirements for the request fulfillment such as validity of the digital signature and/or compliance with one or more policies being fulfilled. In some embodiments, the request encodes a set of key derivation parameters that were used to derive the request signing key. The request may also specify a key path by which a response verification cay should be derived (and an authentication server may derive a response verification key accordingly) although, in some embodiments, the authentication server is able to determine the key path for deriving the response verification key using a key path for the request signing key or without a key path for the request signing key. In this particular example, the frontend server 304 lacks access to the request signing key. For example, the frontend server 304 may lack a stored copy of the request signing key or a copy of another cryptographic key from which the request signing key may be derived. To determine whether to fulfill the request, the frontend server 304 may forward the request and the digital signature to the authentication server 306.

The authentication server 306, upon receiving the request and the digital signature, may derive the request signing key and response verification key, which may also be referred to as a response signing key. In some embodiments, the response verification key is a symmetric cryptographic key and, as a result, the response verification key is used to both generate and verify digital signatures, in such embodiments. It should be noted, however, that while symmetric response verification keys are used extensively throughout the present disclosure for the purpose of illustration of certain embodiments, the techniques disclosed herein are extendible and adaptable to embodiments where requests and/or responses are digitally signed with asymmetric cryptographic keys where, as a result, for example, a response signing key would be different from a corresponding response verification key. Key derivation parameters may be used to derive cryptographic keys by, for instance, using a private cryptographic key to digitally sign a new certificate for a second public/private key pair, where the certificate encodes a key derivation parameter. The private cryptographic key of the public/private key pair may be used to digitally sign yet another certificate of a third public/private key pair, where the certificate encodes another key derivation parameter. Such may be continued to create a chain of certificates usable to verify the validity of a digital signature under a private key so derived. A cryptographic key, whether symmetric or asymmetric, may be referred to generally as a "response signing key," and it should be understood that, where illustrative examples of embodiments are described using response verification keys at the frontend server 304, the techniques may be adapted to use a general "response signing key" where the client has a matching (equal, in some embodiments) "response verification key."

Returning to the illustrated embodiment, the request verification key and response verification keys may be derived such as described above and in more detail below. The request signing key may be used by the authentication server 306 to determine whether the received digital signature matches the request. In some examples, the authentication server 306 uses the request signing key to generate a reference digital signature of the request and determining whether the generated reference digital signature is equal to or otherwise matches the received digital signature. Other operations may also be performed by the authentication server 306. For example, the authentication server 306 may query a database of policies to obtain one or more policies applicable to an identity associated with the client 302 such as an identity corresponding to the request signing key, applicable to one or more computing resources associated with the request, and/or generally applicable to a service of which the frontend server is a component. The authentication server 306 may also generate a forward access session using the request signing key or another key derived from the request signing key or from which the request signing key is derivable or from another cryptographic key. A forward access session, in an embodiment, comprises information comprising cryptographically verifiable proof that the frontend server 304 is authorized to cause requests to other systems to be fulfilled for an entity (e.g., customer) associated with the client 302.

Some or all of the request signing key, response verification key, set of policies and forward access session may be provided to the frontend server 304 with an authentication determination that indicates whether the digital signature matched the request. In some embodiments, some or all of the request signing key, response verification key, set of policies and forward access session may be provided to the frontend server 304 only when the authentication determination is a positive determination (i.e., that indicates that the digital signature matches the request). The information provided to the frontend server is configured to enable the frontend server 304 to perform various operations. The request signing key may be cached by the frontend server 304 to enable the frontend server 304 to verify digital signatures of future requests received from the client 302 so that the frontend server 304 does not need to communicate with the authentication server 306 while the request signing key is valid. The request verification key may similarly be cached by the frontend server 304 to avoid additional communication with the authentication server. The set of policies may also be cached by the frontend server 304 to enable the frontend server 304 to determine whether fulfillment of future requests made by the client 302 would be in compliance with the policies. The forward access session may be used by the frontend server to make requests on behalf of an entity associated with the client 302 to one or more other systems. For example, fulfillment of the request received from the client 302 or a future request received from the client 302 may involve submission of another request to another system and use of the forward access session enables the frontend server 304 to cryptographically prove to the other system authority for submission of that request. The response verification key may be used by the frontend server 304 to enable the frontend server 304 to digitally sign a response to the request that was received from the client 302. The response may be digitally signed before the response is processed in accordance with an implementation of a computer networking protocol suite (also referred to as a protocol stack). For example, transmitting the response may include fragmenting the response for transmissions of the fragments in separate communications. Fragments may be digitally signed (e.g., using a data integrity key) or otherwise processed to ensure the integrity of the fragments after traversing a network. Thus, the response may be digitally signed before the response is processed for transmission.

The frontend server 304, contingent on the authentication determination indicating that the request should be fulfilled may generate a response to the request and may use the response verification key to digitally sign the response thereby generating a digital signature of the response. The response and the digital signature of the response may be transmitted from the frontend server 304 to the client 302. The client 302 may use its copy of the response verification key to verify whether the digital signature of the response matches the response. The client 302 may operate in accordance with whether it has determined that the digital signature matches the response. For example, client 302 may reject the response if the digital signature and response do not match. Generally, the way by which the client operates may depend on whether the digital signature matches the response. In this manner, the client 302 can avoid operating in potentially harmful ways when the response and the digital signature do not match such as when a communication from a malicious entity purporting to be the response has been received by the client 302. As illustrated in FIG. 3, the client 302 may generate additional requests, use the request signing key to sign those additional requests thereby generating digital signatures of those additional requests and may transmit the additional requests with the digital signatures to the frontend server 304. At times during which the request signing key is cached by the frontend server 304, the request signing key may be used by the frontend server 304 to verify whether the digital signatures received match their corresponding requests. Similarly, the frontend server 304 may evaluate whether to fulfill the request based at least in part on one or more policies that have been stored by the frontend server 304 including any policies received from the authentication server 306 such as described above. Such may continue until the frontend server 304 is unable to utilize information received from the authentication server 306 to perform operations itself such as when any of the necessary information has been expunged from the cache, has expired or otherwise has become unavailable to the frontend server 304 for use. In some embodiments, the response verification key has a limited lifetime which is tied to a limited lifetime of the request signing key. For example, the lifetimes may be identical or one of the request signing key or response verification key may have a lifetime that is a function of a lifetime of the other.

Figure 4:
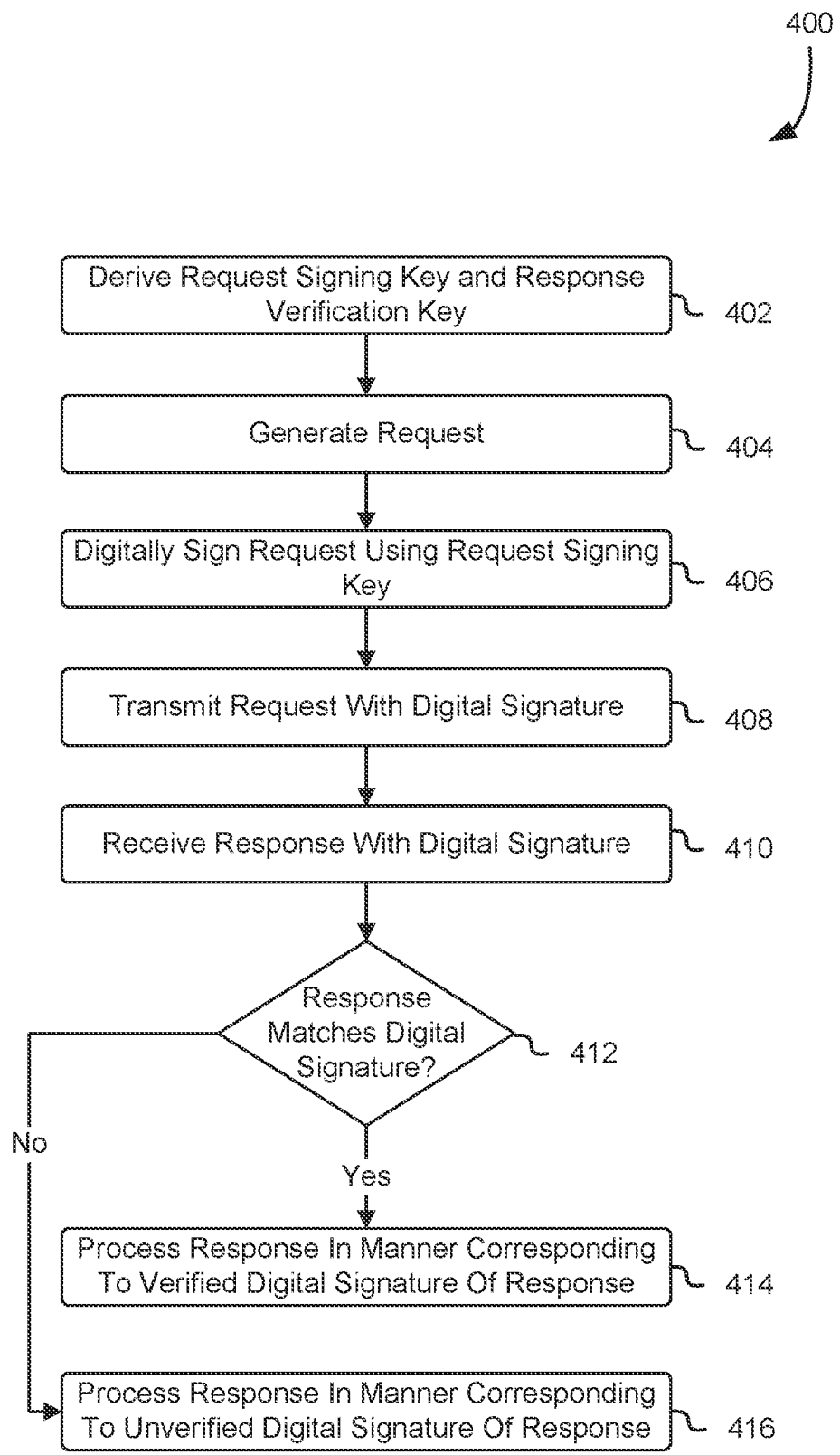
FIG. 4 shows an illustrative example of a process for submitting a request in accordance with at least one embodiment.

FIG. 4 shows an illustrative example of a process 400 for interacting with a service in accordance with at least one embodiment. The process 400 may be performed by any suitable system, such as by a client computer system such as described above. Generally, the process 400 may be performed by any system configured to submit requests to another system and, in some embodiments, the system submitting the requests is a server computer system such as the frontend server 304 discussed above in connection with FIG. 3. Turning to the illustrative example of FIG. 4, in an embodiment, the process 400 includes deriving 402 a request signing key and a response verification key. As discussed above, while FIG. 4 shows derivation of the request signing key and the response verification key being performed at the same time in performance of the process 400, the request signing key and the response verification key may be derived separately or together at different times during the performance of the process 400 and generally may be derived in any manner so as to be available when needed to be used.

As illustrated in FIG. 4, in an embodiment, the process 400 includes generating 404 a request. The request may be generated in any suitable manner and generally may be generated 404 in accordance with a protocol acceptable to a system to which the request will be submitted. In some embodiments the request is a web service request configured in accordance with formatting acceptable to a system to which the request will be submitted. Once the request has been generated 404, the process 400 may include digitally signing 406 the request using the request signing key. The request may be digitally signed in various ways in accordance with various embodiments. For example, in some embodiments, a digital signature of the request is generated using a message authentication code (MAC) such as a hash-based message authentication code (HMAC) algorithm (such as HMAC-SHA256) where the requested signing key and information based at least in part of the message are input into the algorithm. In some embodiments, digitally signing the request and generally digitally signing information may include an additional operation of canonicalizing the information. Canonicalization of the information may be performed by modifying the information in accordance with a canonical format. For example, certain bits may be added or removed. Generally, canonicalization of the information may be performed such that the sequence of bits input into an algorithm for generating the digital signature is configured such that verification that the digital signature matches the request will succeed. In some examples, canonicalization of the information includes extracting parameters from the request, configuring the parameters into a message, and generating a hash of the message. Other examples are also considered as being within the scope of the present disclosure. In addition, it should be noted that responses may be canonicalized for the purpose of generating digital signatures of response. Similarly, verification of digital signatures may also include canonicalization.

Returning to FIG. 4, in an embodiment, the request with the digital signature are transmitted 408 to a system. The system to which the request is transmitted 408 may be, for example, a frontend server such as described above, or generally any system configured to receive requests for processing, such as a system configured to store responses in a database or other system for later providing to a client that submitted the request. Upon transmission 408 of the request, a response to the request with a digital signature of the response may be received 410. It should be noted that the response may be received synchronously or asynchronously relative to the request that was transmitted 408. For example, in some embodiments, the response to the request that was transmitted may include data that was requested in the request. In some examples, responses are provided asynchronously. For example, a request may be received and processing the request may take some amount of time. In response to the request an identifier of a work flow being performed to fulfill the request may be provided. The identifier may be provided in a subsequent request to obtain a status of the work flow and if a response is ready a response may be provided. Other variations are also considered as being within the scope of the present disclosure.

When the response is received 410, a determination may be made 412 whether the response matches the digital signature. Determining 412 whether the response matches the digital signature may be performed in any suitable manner. For example, in some embodiments, the response and the response verification key are used to generate a reference digital signature and the determination whether the response matches the digital signature may include determining whether the reference signature is equal to or otherwise matches the received digital signature. Generally, any way by which the response verification is usable to verify whether the response matches the digital signature may be used. If it is determined 412 that the response does match the digital signature, the process 400 may include processing 414 the response in a manner corresponding to the digital signature of the response being verified. For example, the execution of programming logic with which a system performing the process 400 is configured may depend on whether the response matches the digital signature. If the request, for instance, was a request to retrieve data, requested data included with the response may be utilized if determined 412 that the response matches the digital signature.

If, however, it is determined 412 that the responses does not match the digital signature, the response may be processed 416 in a manner corresponding to the digital signature of the response being unverified. As noted, execution of programming logic with which a system performing the process 400 is configured may depend on whether the received digital signature matches the response and, accordingly, if it is determined 412 that the response does not match the digital signature, a system performing the process 400 may operate accordingly, such as by discarding the response and/or performing other operations, such as performing the process 400 again, by transmitting one or more notifications and/or generally operating differently then had the response been determined 412 to match the digital signature.

Figure 5:
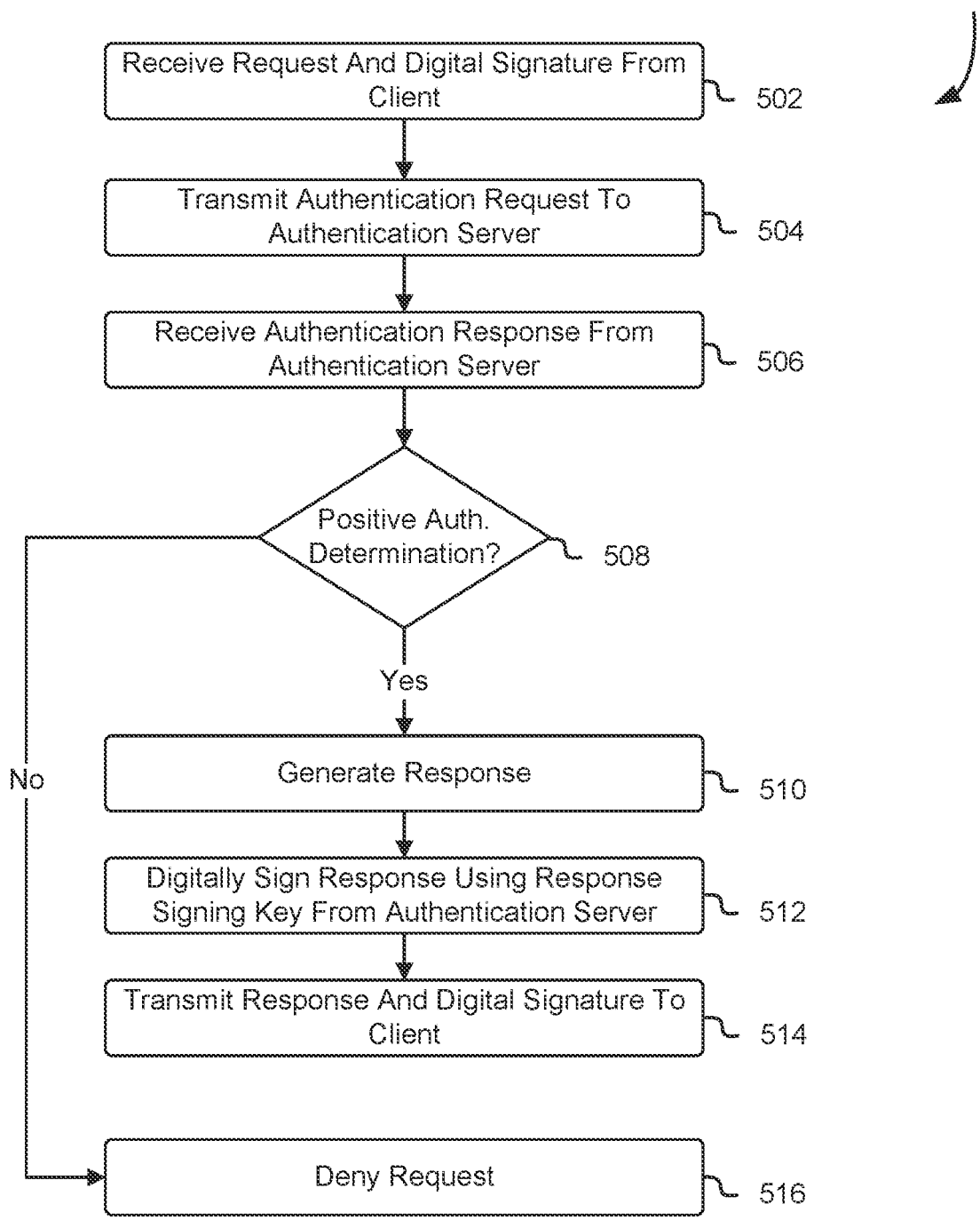
FIG. 5 shows an illustrative example of a process for processing a request in accordance with at least one embodiment.

FIG. 5 shows an illustrative example of a process for processing a request in accordance with an embodiment. The process 500 may be performed by any suitable system, such as by a frontend server described above in connection with FIG. 3. Generally, the process 500 may be performed by any system configured to receive requests and process at least some of the requests. In an embodiment, the process 500 includes receiving 502 a request and a digital signature from a client. An authentication request may be transmitted 504 to an authentication server. The authentication request may be a request configured to cause an authentication server to verify whether the digital signature matches the received 502 request. An authentication response may be received 506 from the authentication server. As noted above, the authentication response may include an authentication determination. The authentication response may also include other information which may be dependent on the authentication determination. In some embodiments, for example, if the authentication determination is positive at least some of the time the authentication response will also include a response signing key (as noted, which may be a response verification key). Other information may also be included, such as a request signing key, a set of one or more policies applicable to an entity associated with the received 502 request, and a forward access session, such as described above. Accordingly, as indicated in FIG. 5, if it is determined 508 that the authentication determination in the authentication response that was received 506 is positive, the process 500 may include generating 510 a response. The response may be generated 510 in any suitable manner and generally may include performing one or more operations involved with fulfillment of the request.

The response that has been generated 510 may be digitally signed 512 using a response signing key (which may be a response verification key) received from the authentication server which, in some examples, is received in the authentication response from the authentication server. As noted above, digitally signing the response causes the generation of a digital signature and, accordingly, as illustrated in FIG. 5, the process 500 may include transmitting 514 the response and the digital signature to the client. It should be noted, as discussed above, that responses may be provided asynchronously and, accordingly, variations of the process 500 are also considered as being within the scope of the present disclosure such as the performance of additional operations between when the request is received 502 and the response and digital signature are transmitted 514.

Returning to the embodiment illustrated in FIG. 5, if it is determined 508 that the authentication determination in the authentication response that was received 506 is not positive (e.g., because the authentication server was unable to verify that the digital signature matches the request or because the digital signature does not, in fact, match the request), then the process 500 may include denying 516 the request. Denying the request may be performed in various ways in accordance with various embodiments. In some examples, a response to the request is provided where the response indicates the denial and/or one or more reasons for the denial. In some embodiments, denying the request may include taking no action whatsoever and not communicating further with the client that submitted the request. Generally, any way by which a request may be denied is considered as being within the scope of the present disclosure.

As noted, variations of the process 500 and other processes described herein are considered as being within the scope of the present disclosure. As illustrated in FIG. 5, for example, in some embodiments a system that received a request may itself submit a request to another system such as an authentication server. Such request may be digitally signed to enable the authentication server or other system to determine whether to fulfill the request. An authentication server, for example, may verify a digital signature generated by a frontend server to determine whether to provide an authentication response. Further, the authentication response may be digitally signed using various techniques described herein. Accordingly, a frontend server or other system performing the process 500 may verify a digital signature from the authentication server and process the digital signature generated by the authentication server accordingly. For example, a system performing the process 500 may operate differently when it is determined that the digital signature generated by the authentication server is valid than if it is determined that the digital signature generated by the authentication server is invalid. Other variations are also considered as being within the scope of the present disclosure.

Figure 6:
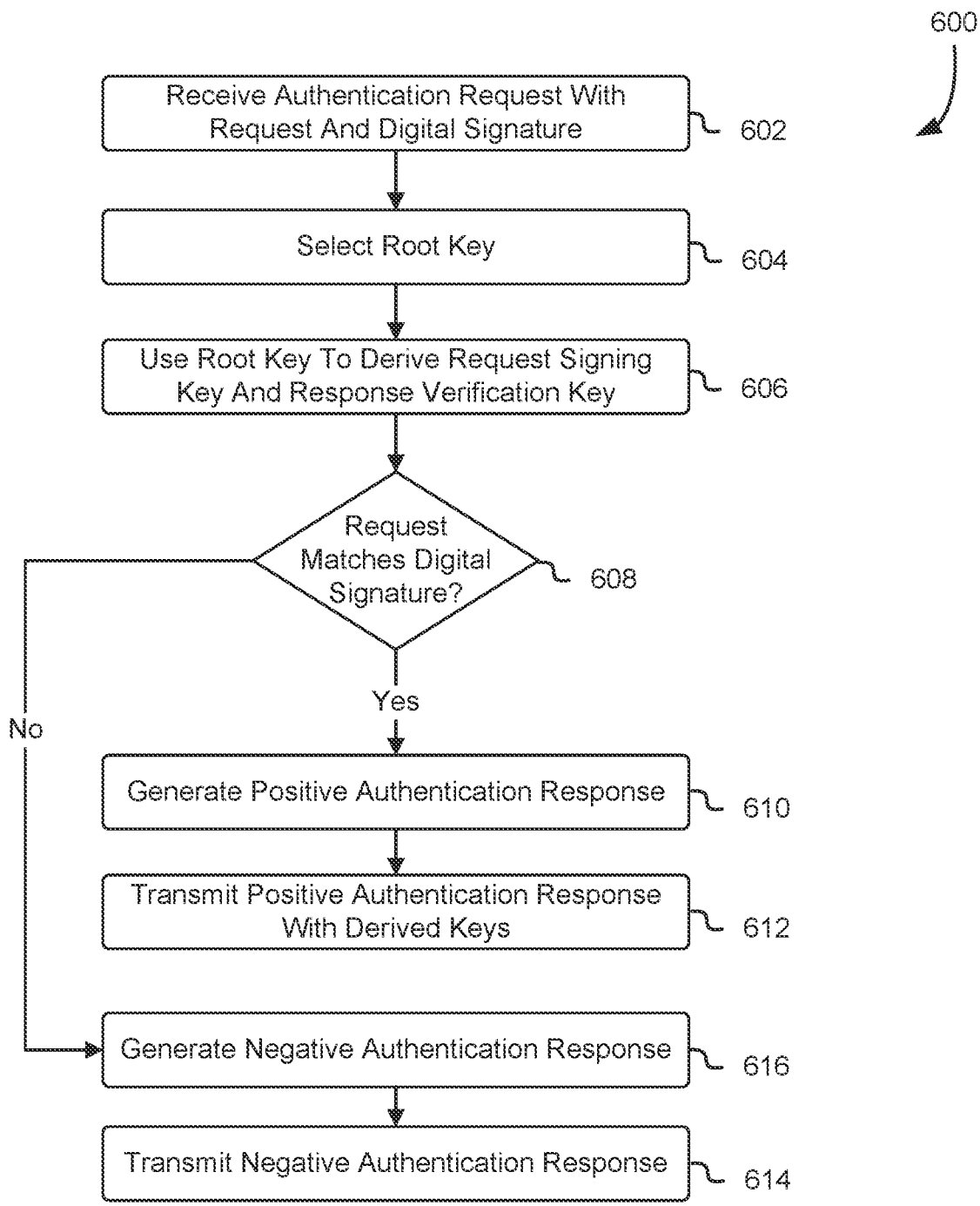
FIG. 6 shows an illustrative example of a process for participating in fulfillment of a request in accordance with at least one embodiment.

FIG. 6 shows an illustrative example of a process for responding to an authentication request such as described above. The process 600 may be performed by any suitable system, such as by an authentication server described above in connection with FIG. 3. An embodiment of the process 600, including receiving 602 an authentication request that includes a request a digital signature. To process the authentication request the process 600 may include selecting 604 a root key. As noted above, a system performing the process 600 may have available multiple root keys such as different root keys corresponding to different entities where the different entities may be customers of a service provider that operates the system performing the process 600. The root key may be selected 604 in various ways in accordance with various embodiments. In some examples, the request and/or authentication request include an identifier of the root key. In other examples, the root key is implicitly specified by the request and/or authentication request. For example, the request and/or authentication request may include an identifier of a customer or an identity associated with the customer or generally an identifier of an entity. A system performing the process 600 may maintain a data store that associates entities with root keys and, because the request and/or authentication request indicated the entity, the root key may be selected. Generally, the request and/or authentication request may include information usable to determine which root key should be selected.

Once the root key has been selected 604, the process 600 may include using 606 the root key to derive a request signing key and a response verification key such as described above. However, it should be noted (see above) that variations include those where the request signing key and response verification key are derived from different root keys, neither of which is an ancestor of the other. Other variations including those discussed above are also considered as being within the scope of the present disclosure. The derived request signing key may be used to determine 608 whether the request matches the digital signature. Determining 608 whether the request matches the digital signature may be performed in various ways in accordance with various embodiments, such as described above. If it is determined 608 that the request does match the digital signature, the process 600 may include generating 610 a positive authentication response that includes an authentication determination indicating that the request matches the digital signature. The positive authentication response may also include other information such as described above. For example, the positive authentication response may include the request to the signing key or response verification key. Further, as noted, additional operations may be performed such as determining one or more policies applicable to an entity associated with the request and/or generating a forward access session. Policies and/or a forward access session may also be included in the generated positive authentication response. The positive authentication response with the derived keys and/or any additional information may be transmitted 612 to the system that submitted the authentication request that was received 602. As noted, numerous variations are considered to be within the scope of the present disclosure such as when a system performing the process 600 uses a cryptographic key corresponding to the system performing the process 600 to digitally sign the authentication response to enable the authentication response's authenticity to be determined.

If it is determined 608 that the request does match the digital signature, the process 600 may include generating 616 a negative authentication response. A negative authentication response may include an authentication determination that indicates that the request does not match the digital signature. In some embodiments, the negative authentication response lacks the derived request signing key, response verification key, policies and/or a forward access session. The negative authentication response may be transmitted 614 to the system that submitted the received 602 authentication request. Other operations may also be performed in accordance with variations of the process 600 considered as being within the scope of the present disclosure. For example, as noted, the authentication request may be digitally signed using a key corresponding to the system that submitted the authentication request. Accordingly, the process 600 may include verifying the digital signature of the authentication request and operating accordingly, such as by not providing an authentication response if the digital signature of the authentication request does not match the authentication request. Other variations are also considered as being within the scope of the present disclosure.

Figure 7:
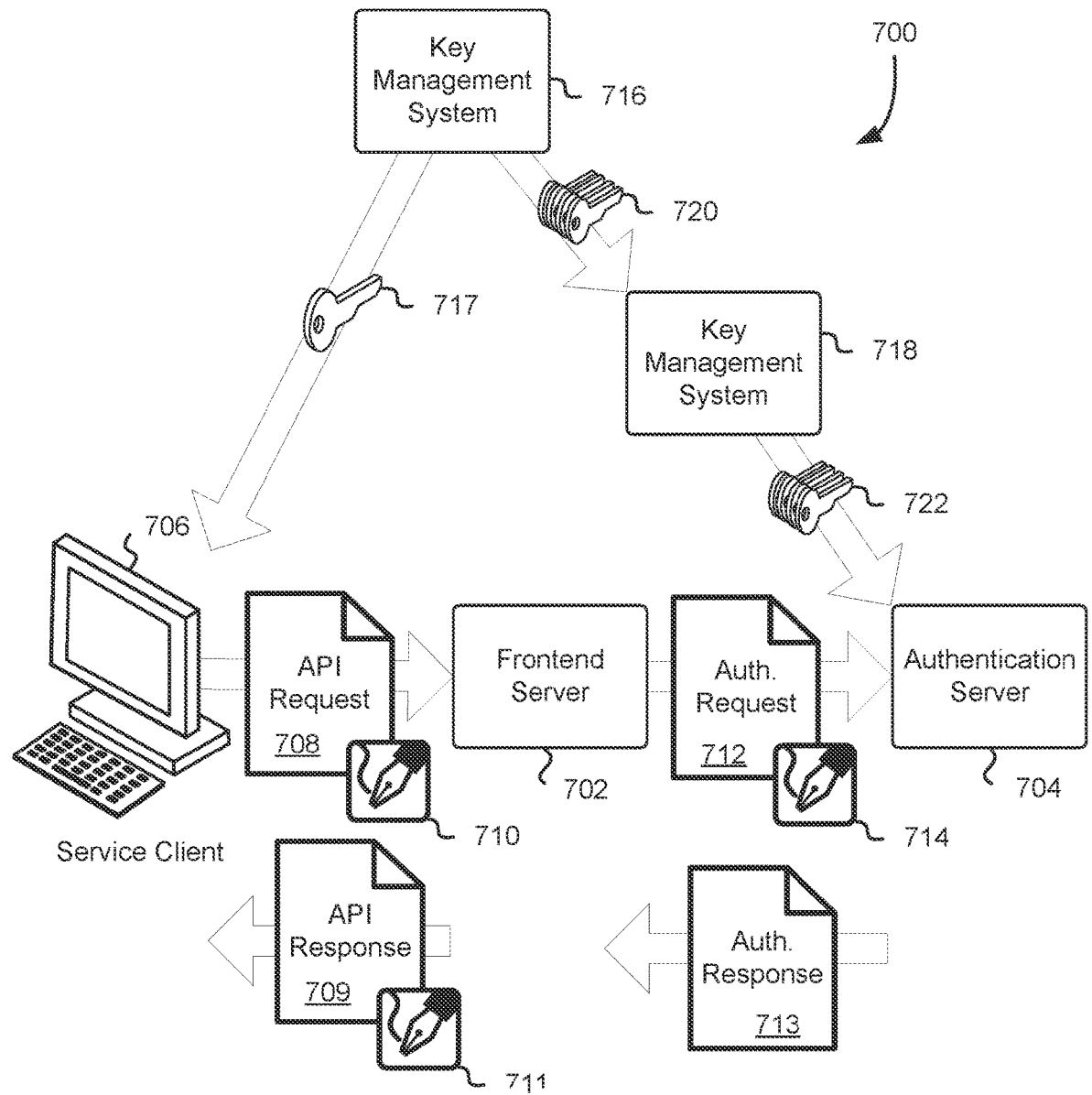
FIG. 7 shows an illustrative example of an environment in which various embodiments may be practiced.

As noted above, the techniques described herein are usable in a variety of computing environments. FIG. 7, accordingly, shows an illustrative example of an environment 700 in which various embodiments may be implemented. In this example, the environment 700 includes a frontend server 702 and an authentication server 704. The frontend server may be implemented to provide an application programming interface for accessing a service where resources of the service may be hosted using the computing device and/or other computing devices (not pictured). For example, the frontend server 702 may be a member of a fleet of client computing nodes, each node comprising a computing device. Similarly, the authentication server 704 may be a computing device configured to verify digital signatures using cryptographic keys provided to the authentication server. For example, the authentication server 704 may be a member of a fleet of authentication devices, each configured to perform various operations in connection with authentication, such as digital signature checking, cryptographic key derivation, and forward access session generation.

In various embodiments, the frontend server 702 and authentication server 704 are under the control of the same entity. In some examples, the frontend server 702 and authentication server 704 communicate over an isolated network that is under the control of the entity. The frontend server 702, in some embodiments, includes a web server that processes web service API requests to perform various operations in accordance with a service provider associated with the frontend server 702. Embodiments where the authentication server and frontend server are controlled by different entities, however, are considered as being within the scope of the present disclosure.

As discussed in more detail below, the frontend server 702 may communicate with the authentication server 704 for the purpose of verifying digital signatures of requests received by the frontend server 702. For example, in some embodiments, a service client 706 transmits a digitally signed API request 708 to the frontend server 702. The API request 708 may, for example, be a web service request configured to cause a service of the service provider to perform one or more corresponding operations. As the API request 708 is digitally signed, the API request may be transmitted by the service client 706 with a digital signature 710 which may be verified by the authentication server 704, such as described above. In particular, the frontend server 702 may forward the API request 708 and digital signature 710 in an authentication request 712 to the authentication server 704. The frontend server 702 may process the API request 708 in various ways in accordance with various embodiments, and the manner by which the frontend server processes API requests may vary in accordance with the type of service being provided and the particular type of request that is submitted. In some examples, the frontend server 702 performs some or all of fulfillment of the request itself. In other examples, the frontend server 702 causes one or more other computing devices to perform a role in fulfillment of the request. In some embodiments, a request is fulfilled by the frontend server 702 triggering a workflow comprising operations performed by one or more other computing devices. Other variations are also considered as being within the scope of the present disclosure.

In various embodiments, the authentication request 712 is digitally signed using a cryptographic key corresponding to the frontend server and, therefore, the frontend server 702 transmits the authentication request 712 with a digital signature 714 of the authentication request 712. The authentication server 704 may verify the digital signature 714 using a key associated with the frontend server (e.g., a symmetric cryptographic key corresponding to the frontend server 702 or a public cryptographic key corresponding to a private cryptographic key of the frontend server 702) and operate with successful verification of the digital signature 714 as a condition for providing a verification response indicating whether the digital signature 710 of the service client 706 is valid.

To notify the frontend server whether the digital signature 710 is valid, the authentication server 704 may transmit an authentication response 713 to the frontend server 702. The authentication response 713 may be as described above, such as by including a response verification key and, in some embodiments, additional information, such as described above. While not illustrated as such, the authentication response 713 may be digitally signed by the authentication server 704 using cryptographic material available to both the frontend server 702 and the authentication server, where a signing key may be derived such as described elsewhere herein. Generally, the authentication server 704 may digitally sign the authentication response 713 such that a digital signature is verifiable by the frontend server 702, either itself, or by communicating with another authentication server. On a condition that the authentication response 713 is positive (e.g., indicating that the API request 708 matches the digital signature 710 and/or that fulfillment of the request is in compliance with a set of applicable policies), the frontend server 702 may generate an API response 709 and a digital signature 711 of the API response 709 and provide the API response 709 and digital signature 711 to the service client 706. As noted, the API response 709 and digital signature 711 may be provided synchronously in response to the API request 708 or asynchronously. In some embodiments, a different frontend server is able to generate the digital signature and provide the response than a frontend server that received the API request. Such may be the case, for example, when requests are processed asynchronously and where an authentication response is stored with an API response until retrieved, at which time a frontend server or other entity may use a request verification key in the authentication response to digitally sign the response.

As noted above, the keys used to verify digital signatures and generate digital signatures may be provided to the systems that performed digital signature verification and generation. Accordingly, as illustrated in FIG. 7, the environment 700 includes a first key management system 716 and a second key management system 718. In some embodiments, the first key management system 716 has access to cryptographic keys shared with various service clients who may be customers of a computing resource service provider that provides the service.

As illustrated in FIG. 7, the first key management system 716 may provide a cryptographic key 717 to the service client 706 and store the cryptographic key 717 or another cryptographic key from which the cryptographic key 717 is derivable. The first key management system 716 and service client 706 may share the cryptographic key 717 in other ways, such as by the service client 706 providing the cryptographic key 717 to the first key management system 716, or by another system (not pictured) providing both the service client 706 and the first key management system 716 the cryptographic key 717. The transfer of cryptographic keys between entities may be performed in various ways, such as by transmission over an encrypted channel, by encrypting cryptographic key(s) to a public key of a recipient entity and transmitting the encrypted cryptographic key(s) to the entity, by physically transferring a computer-readable medium storing the cryptographic keys from one entity to the other, and the like.

The first key management system 716 may transmit keys derived from those shared cryptographic keys to second key management system 718. In one example, the first key management system 716 is a central key management system used to provide cryptographic keys to various subsystems of a distributed computing environment that is distributed among multiple regions. The second key management system 718 may comprise a key management system in a particular region (i.e., a regional key management system) and the keys 720 provided from the first key management system 716 to the second key management system 718 may be generated (i.e., derived from the clients of the service) so as to only be usable within the particular region of the second key management system 718. The second key management system 718 may use one or more of the received keys 720 to derive keys 722 that are provided to the frontend server 702 and the authentication server 704 to enable the frontend server and the authentication server 704 to perform signature verification and/or generation. The keys 722 may be generated from the keys 720 so as to have a smaller scope of use; that is, to be useable for a smaller set of uses for which the keys 722 are usable, such as described in more detail below. Generally, a first cryptographic key may have a larger scope of use than a second cryptographic key derived from the first cryptographic key because, in some embodiments: the second cryptographic key is sufficient to cause a first set of operations; the first cryptographic key is also usable to derive a third cryptographic key that the second cryptographic key is usable to derive; and the third cryptographic key is usable to cause at least one operation that the second cryptographic key is insufficient to cause. Additional details are discussed below.

It should be noted that FIG. 7 is illustrative in nature and that fewer or more key management systems may be used in various embodiments. For example, in some embodiments, a central key management system, for each of multiple regions, derives cryptographic keys and transmits the derived cryptographic keys to a key management system in a region. The regional key management system may use the derived cryptographic keys to derive keys for each of a plurality of services and provide the derived cryptographic keys to the service. Individual services may further derive cryptographic keys, e.g., for host computing devices of the service, and the like. Generally, the levels of cryptographic key derivation may vary in accordance with various embodiments.

Figure 8:
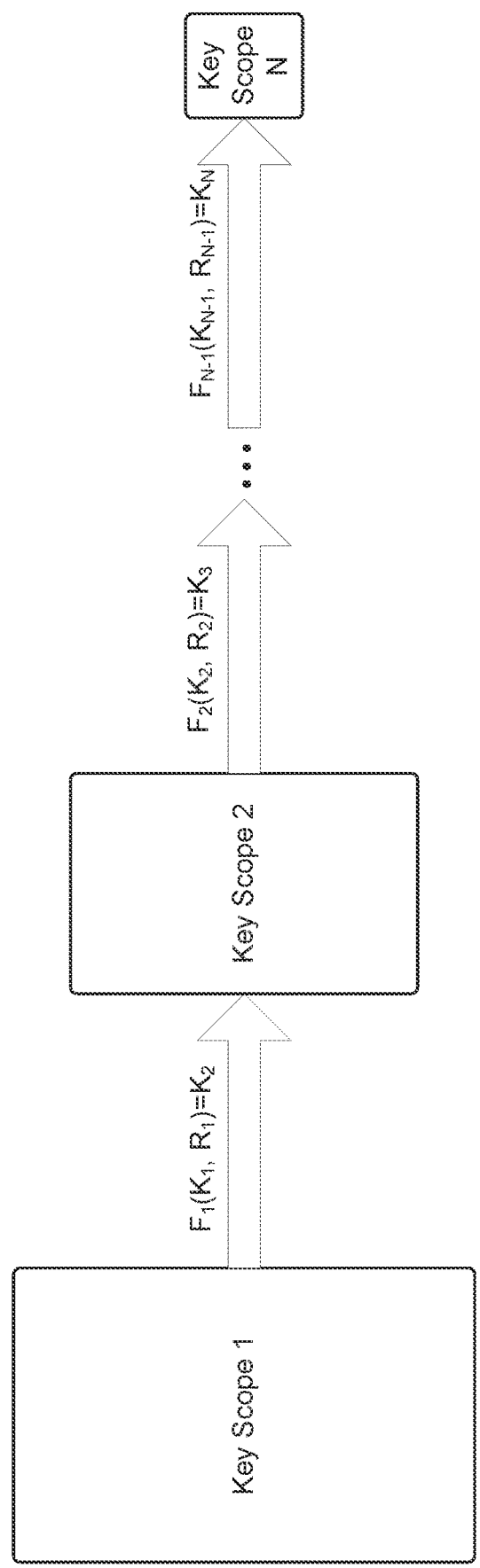
FIG. 8 shows an illustrative diagram demonstrating key derivation in accordance with at least one embodiment.

FIG. 8 shows an illustrative example of a diagram illustrating the scoping of cryptographic keys in a manner usable in accordance with various embodiments of the present disclosure. In an embodiment, a first key has a first key scope (labeled as "Key Scope 1" in the figure). The first key may, for instance, be a key shared as a secret between a computing resource service provider and a customer of the computing resource service provider or, generally, a key shared between two entities. The first key scope may correspond to a set of uses for which the first key is usable (e.g., a set of uses for which use of the first key is usable for successful authentication of messages). As an example, the first key may, through appropriate derivation, be usable in multiple regions of a computing resource service provider by using an encoding of each region to derive, from the first key, a suitable regional key.

Accordingly, as illustrated in FIG. 8, the first key may be used to derive a second key having a second key scope (labeled as "Key Scope 2"). While omitted from the drawing to avoid obscuring the illustration, the first key may be used to derive multiple second keys, each with a different second key scope. This second key may be used to derive a third key, which may be used to derive another key, and so on. To derive a series of keys one from another, the following formula, or variations thereof, may be used:

$$K_N = F_{N-1}(K_{N-1}, R_{N-1})$$

where $K_N$ is the Nth derived key (N being a positive integer), $F_{N-1}$ is a one-way function or otherwise based, at least in part, on a one-way function, such as a cryptographic hash function, message authentication code algorithm, or a key derivation function, described above, and $R_{N-1}$ is an encoding of a restriction. It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. Thus, the allowable scope of use for $K_N$ is the scope of use of $K_{N-1}$ restricted by the restriction corresponding to $R_{N-1}$. Each encoding of a restriction $R_i$ may be an encoding of a different restriction, such as described above and below. Each function $F_i$ may be the same function or different functions $F_i$ (for some or all different values of i) may be different. Values for R are considered restrictions because, due to the mathematical properties of the function(s) F, access to the values of R and output of $F_{N+1}$, without a cryptographic key used to generate the output of $F_{N+1}$ does not provide access to the cryptographic key. As a result, access to one or more resources may be managed by distributing derived cryptographic keys in according to the restrictions corresponding to the values of R. For example, a key management system may manage keys for multiple regions. A single root key may be used to derive multiple regional keys, each derived with a different value of R corresponding to a different region. Regional keys may be transferred to regional systems. In this manner, because of the manner in which regional keys are generated, a regional system (or other entity) with a corresponding regional key, without access to the root key used to generate the regional key, is unable to determine a regional key of another region without, for instance, extraordinary expenditure of computational resources necessary for a cryptographic (e.g., brute force) attack.

Figure 9:
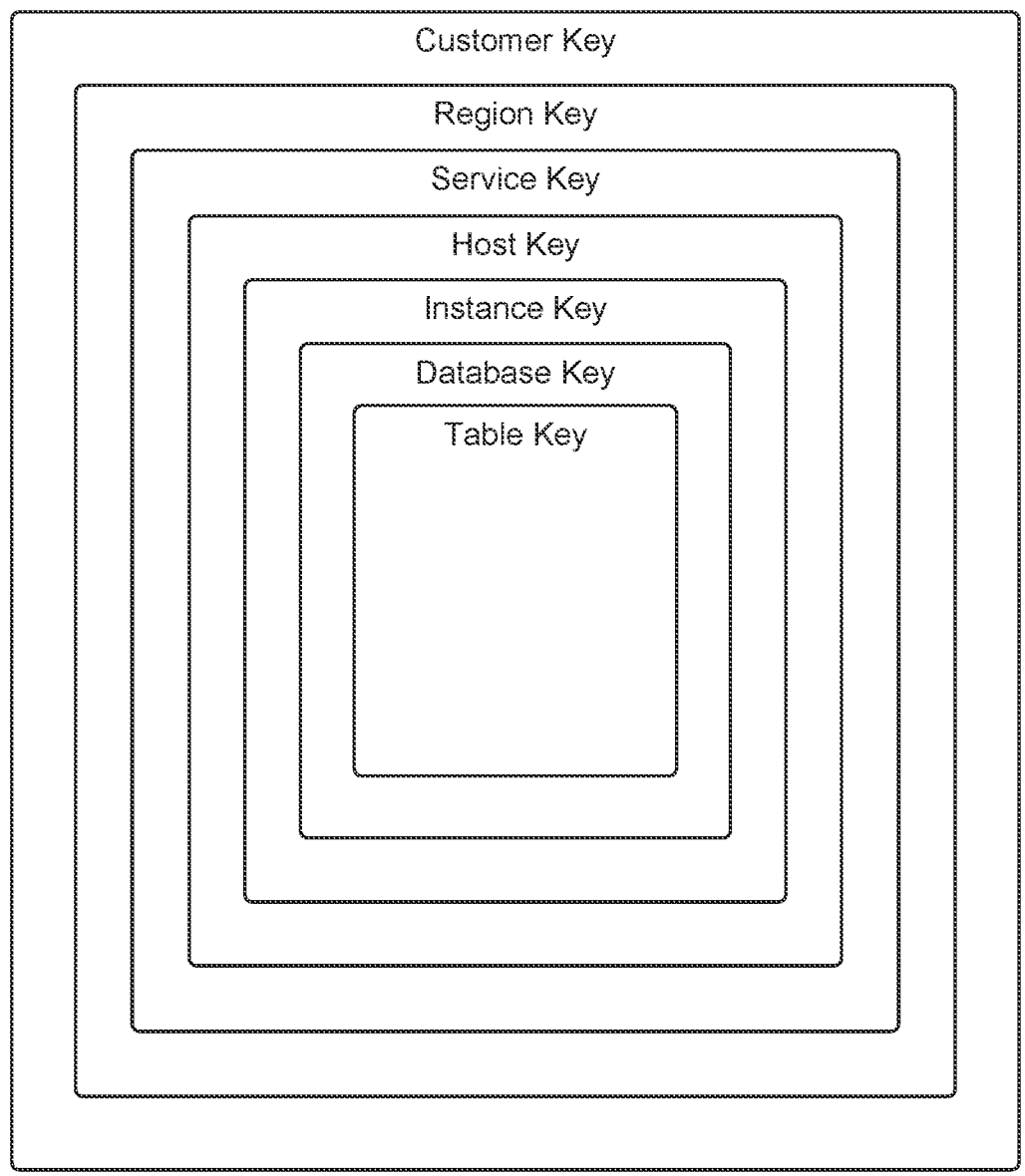
FIG. 9 shows a diagram illustrating scoping of cryptographic keys in accordance with at least one embodiment.

As discussed above, numerous types of restrictions may be used to scope cryptographic keys. FIG. 9, accordingly, shows an illustrative example of a diagram illustrating one way in which a cryptographic key may be scoped. In this particular example, a series of boxes appears where each box represents a scope of use of a cryptographic key. The boxes are arranged in a Venn diagram so that, if a first box is contained in a second box, set of uses for which a first cryptographic key is usable is a proper subset of a set of uses for which a second cryptographic key is usable, where the first cryptographic key is directly or indirectly derived from the second cryptographic key.

In this illustrative figure, a customer key may be a key shared between a computing resource service provider and a customer of the computing resource service provider. The customer key may be usable to validly digitally sign requests that the customer is authorized to make (i.e., requests that the customer is able to submit and cause to be fulfilled). It should be noted that, to be usable for all uses for which the customer is authorized, it may be necessary to use the key to derive another key that is used as a signing key. In various embodiments, the encodings of restrictions are public or otherwise available to the customer so that the customer (through an appropriate computing device) is able to derive a key appropriate for a particular use. For instance, to sign an API request to be transmitted to a particular region of the service provider, the customer may derive a signing key based at least in part on the encoding for the region. Such may be necessary, for example, when devices used to verify signatures in the region lack access to the customer key and, therefore, are unable to verify digital signatures generated directly using the customer key.

As illustrated, the customer key may be used to derive a region key, usable only within a particular region. The region key may be used to derive a service key, usable only to submit requests to a particular service operated in the region. The service key may be used to derive a host key, which may be a key usable only on a particular computing device (host). The host key may be used to derive an instance key, which may be a key usable only on a particular virtual machine instance supported by the host. The instance key may be used to derive a database key, which may be a key usable only for operations on a particular database. The database key may be a key usable only for operations on a particular table of the database (in embodiments where the database utilizes table structures). The particular restrictions and order in which keys are derived are illustrative in nature and various embodiments may utilize fewer restrictions and/or may perform key derivations in a different order than illustrated in the figure. Other restrictions may also be used, such as time-based restrictions, identity-based restrictions and, generally, any way by which a set of uses of a cryptographic key is restrictable.

The various keys and scopes represented in FIG. 9 (and variations thereof) may be derived in various ways in accordance with various embodiments. For example, different devices of different computer systems may perform the various derivations that ultimately result in a signing key being derived. For instance, a key management system may perform one derivation and transmit the result to another system which performs further derivation. In some examples, a device performing digital signature generation and/or digital signature verification may perform one or more derivations to obtain a signing (verifying) key. Features of a request and/or command may be used to determine which restrictions (e.g., which customer, which database, which table, which host, etc.) need to be used to perform one or more key derivations. Other variations are also considered as being within the scope of the present disclosure.

The above description mentions numerous cryptographic operations (e.g., encryption, decryption, digital signature generation, digital signature verification) that may be performed. Cryptographic operations that may be performed in various embodiments include, but are not limited to digital signature generation, digital signature verification, encryption, decryption, and random number generation. Operations that utilize cryptographic keys include, but are not limited to, public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Example modes of block ciphers include, but are not limited to, the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as extended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, Galois/Counter (GCM) mode. Symmetric key algorithms may also include those used to generate output of one way functions and include, but are not limited to algorithms that utilize hash-based message authentication codes (HMACs), message authentication codes (MACs) in general, PBKDF2 and Bcrypt.

Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Figure 10:
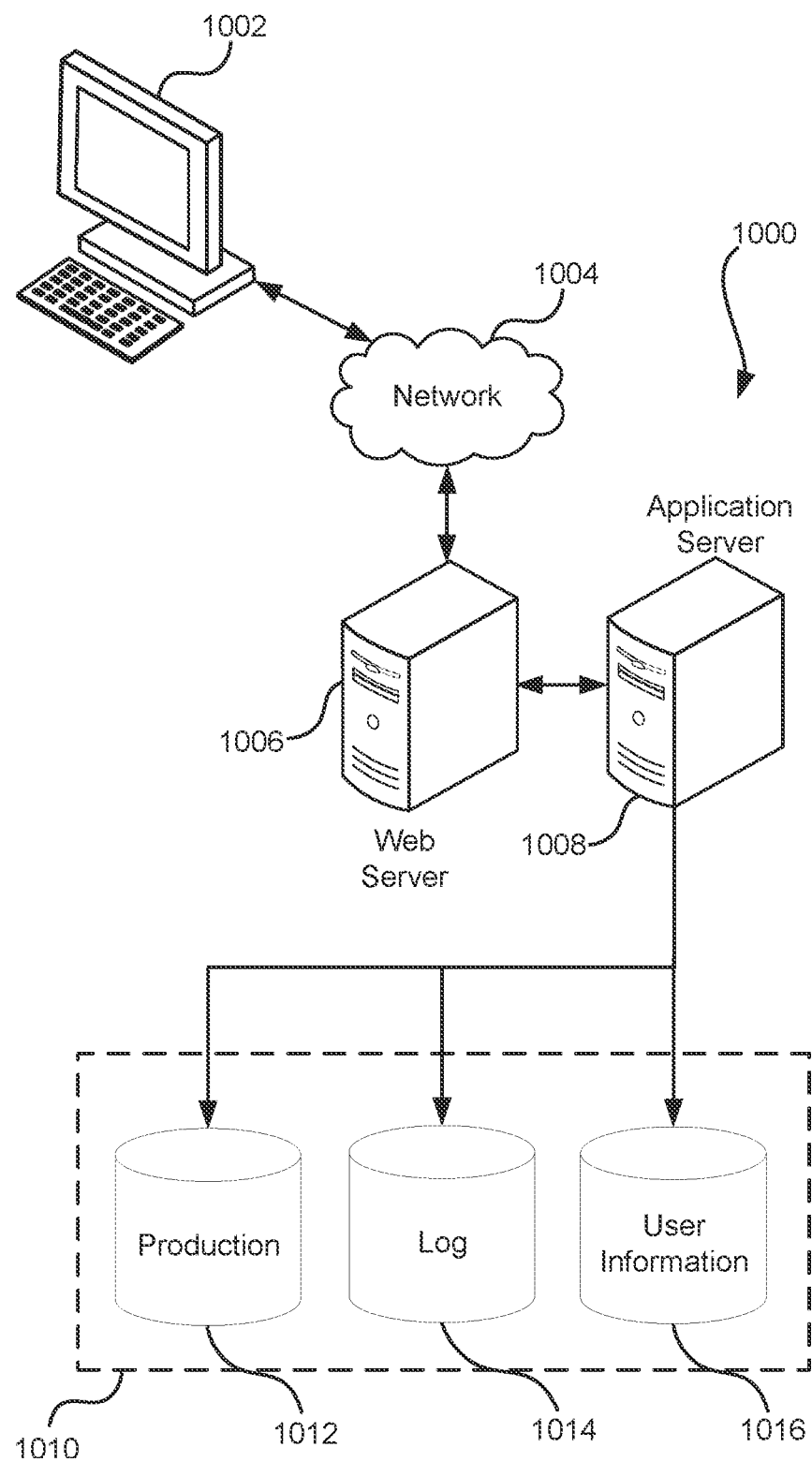
FIG. 10 illustrates an environment in which various embodiments can be implemented.

Other variations are also considered as being within the scope of the present disclosure. For example, the above description, for the purpose of illustration, focuses on cryptographic key derivation using cryptographic material shared between two systems (e.g., customer and service provider). However, the techniques described above may be adapted for use where, generally, a system generates information usable to generate response signatures that are verifiable using information to requestors that generated requests resulting in the responses. For example, an authentication server may generate a public-private key pair, generate an X.509 or other certificate that binds the public key of the public-private key pair (a first public key) to responses for a particular identity (e.g., customer identity) within a particular time frame. In this manner, the private key of the public-private key pair (a first private key) may be used to digitally sign responses using asymmetric cryptographic algorithms. The certificate may be digitally signed using a second private key corresponding to a public key (second public key) encoded in a software development kit available to customers. The certificate and first private key may be provided to a frontend server thereby enabling the frontend server to use the first private key to digitally sign responses and provide with the responses the certificate. The requestor (utilizing the SDK or otherwise having the second public key) may use the first public key to verify the digital signature of the response and may use the second public key to verify the validity of the certificate provided from the frontend server. Other variations that use asymmetric cryptography may also be used. FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate devi600ce operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
obtaining an indication at a first computer system and from a requestor that a request digital signature matches a request, the indication obtained from an authentication system with access to cryptographic material that is inaccessible to the first computer system and used to derive a cryptographic key obtained in response to the indication;
using a second cryptographic key different from and associated with the cryptographic key obtained in response to the indication, to verify the request digital signature, the second cryptographic key being derived from the cryptographic material, the cryptographic key being:
configured to sign the second cryptographic key,
configured to sign a response to the request based at least in part on an ordered plurality of key derivation parameters, and
derived from a plurality of cryptographic operations including at least one cryptographic operation based at least in part on output of a previous cryptographic operation of the plurality of cryptographic operations and a key derivation parameter of the ordered plurality of key derivation parameters; and
transmitting the signed response to the requestor.

2. The computer-implemented method of claim 1, further comprising generating a digital signature for the response to the request and the request digital signature that matches the request, by performing one or more cryptographic operations.

3. The computer-implemented method of claim 1, further comprising obtaining the request from a requestor, the request including the request digital signature and one or more operations to be performed for the requestor.

4. The computer-implemented method of claim 1, further comprising:
generating the response to the request based at least in part on the indication that the request digital signature matches the request; and
generating a response digital signature of the response based at least in part on the cryptographic key.

5. The computer-implemented method of claim 1, further comprising using information associated with the cryptographic key to submit at least one request to a second computer system, the information usable to cryptographically prove, to the second computer system, authority to cause the second computer system to fulfill a request submitted on behalf of a requestor.

6. The computer-implemented method of claim 1, further comprising obtaining the cryptographic key as a result of the request digital signature matching the request.

7. The computer-implemented method of claim 1, wherein the obtaining the indication the request digital signature matches the request includes an indication that the request digital signature matches an application programming interface request generated by a requestor that generated the request.

8. A system, comprising:
at least one computing device that at least:
obtains an indication at a first computer system and from a requestor that a request digital signature matches a request, the indication obtained from an authentication system with access to cryptographic material that is inaccessible to the first computer system and used to derive a cryptographic key obtained in response to the indication;
uses a second cryptographic key different from and associated with the cryptographic key obtained in response to the indication, to verify the request digital signature, the second cryptographic key being derived from the cryptographic material, the cryptographic key being configured to sign the second cryptographic key and a response to the request based at least in part on an ordered plurality of key derivation parameters, and the cryptographic key being derived from a plurality of cryptographic operations including at least one cryptographic operation that is based at least in part on output of a previous cryptographic operation of the plurality of cryptographic operations and a key derivation parameter of the ordered plurality of key derivation parameters; and
transmits the signed response to the requestor.

9. The system of claim 8, wherein the at least one computing device further generates a digital signature for the response to the request based at least in part on an ordered plurality of derivation parameters.

10. The system of claim 8, wherein the at least one computing device further obtains the request and the request digital signature via a separate computing system separate from the at least one computing device, with the request generated by a requestor.

11. The system of claim 10, wherein the at least one computing device further provides information usable to generate one or more response signatures to the separate computing system as a result of the request digital signature matching the request.

12. The system of claim 11, wherein the information usable to generate the one or more response signatures comprises the cryptographic key that is derived based at least in part on the cryptographic material used by the requestor to generate the request digital signature associated with the request.

13. The system of claim 8, wherein the cryptographic key is derived by an authentication server.

14. The system of claim 8, wherein the request is an application programming interface request.

15. A non-transitory computer-readable storage medium comprising executable instructions that, when executed by one or more processors of a first computer system, cause the first computer system to at least:
obtain an indication at the first computer system and from a requestor that a request digital signature matches a request, the indication obtained from an authentication system with access to cryptographic material that is inaccessible to the first computer system and used to derive a cryptographic key obtained in response to the indication;

use a second cryptographic key different from and associated with the cryptographic key obtained in response to the indication, to verify the request digital signature, the second cryptographic key being derived from the cryptographic material, the cryptographic key being configured to sign the second cryptographic key and a response to the request based at least in part on an ordered plurality of key derivation parameters, and the cryptographic key being derived from a set of sequential interdependent cryptographic operations, wherein the set of sequential interdependent cryptographic operations comprising a plurality of cryptographic operations including at least one cryptographic operation based at least in part on output of a previous cryptographic operation of the plurality of cryptographic operations and a key derivation parameter of the ordered plurality of key derivation parameters in accordance with an ordering; and transmit the signed response to the requestor.

16. The non-transitory computer-readable storage medium of claim 15, wherein the instructions further comprise instructions that, when executed by the one or more processors, cause the first computer system to generate a digital signature for the request digital signature that matches the request.

17. The non-transitory computer-readable storage medium of claim 15, wherein the instructions further comprise instructions that, when executed by the one or more processors, cause the first computer system to:

generate the response to the request based at least in part on the indication that the request digital signature matches the request; and provide the response and a response digital signature of the response to a requestor associated with the request, the response digital signature verifiable using verification data available to the requestor associated with the request.

18. The non-transitory computer-readable storage medium of claim 15, wherein a digital signature of the response to the request is verifiable using verification data available to a requestor associated with the request, with the verification data being unavailable to the first computer system.

19. The non-transitory computer-readable storage medium of claim 15, wherein the cryptographic key is operable to sign the response to the request and the second cryptographic key derived from the cryptographic material, with the cryptographic material being available to a requestor that generated the request.

20. The non-transitory computer-readable storage medium of claim 19, wherein the instructions further comprise instructions that, when executed by the one or more processors, cause the first computer system to use the second cryptographic key to perform at least one operation as a result of receipt of a future request from the requestor.

* * * * *